US011401454B2

(12) United States Patent
Southwell et al.

(10) Patent No.: US 11,401,454 B2
(45) Date of Patent: *Aug. 2, 2022

(54) HYDROCARBON FORMATION TREATMENT MICELLAR SOLUTIONS

(71) Applicant: Nissan Chemical America Corporation, Houston, TX (US)

(72) Inventors: John Edmond Southwell, Glen Ellyn, IL (US); Yusra Khan Ahmad, Webster, TX (US)

(73) Assignee: Nissan Chemical America Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/228,366

(22) Filed: Apr. 12, 2021

(65) Prior Publication Data

US 2021/0238471 A1 Aug. 5, 2021

Related U.S. Application Data

(63) Continuation of application No. 16/453,087, filed on Jun. 26, 2019, now Pat. No. 10,975,289, which is a continuation of application No. 15/946,338, filed on Apr. 5, 2018, now Pat. No. 10,377,942.

(60) Provisional application No. 62/482,461, filed on Apr. 6, 2017, provisional application No. 62/482,429, filed on Apr. 6, 2017, provisional application No. 62/482,470, filed on Apr. 6, 2017.

(51) Int. Cl.
| | |
|---|---|
| C09K 8/588 | (2006.01) |
| C09K 8/68 | (2006.01) |
| C09K 8/86 | (2006.01) |
| C09K 8/88 | (2006.01) |
| C09K 8/03 | (2006.01) |
| C09K 8/60 | (2006.01) |
| C09K 8/66 | (2006.01) |
| C09K 8/84 | (2006.01) |
| C09K 8/90 | (2006.01) |
| C09K 8/72 | (2006.01) |

(52) U.S. Cl.
CPC ........... *C09K 8/588* (2013.01); *C09K 8/03* (2013.01); *C09K 8/604* (2013.01); *C09K 8/665* (2013.01); *C09K 8/68* (2013.01); *C09K 8/845* (2013.01); *C09K 8/86* (2013.01); *C09K 8/88* (2013.01); *C09K 8/905* (2013.01); C09K 8/72 (2013.01); C09K 2208/10 (2013.01)

(58) Field of Classification Search
CPC .......... C09K 8/588; C09K 8/03; C09K 8/604; C09K 8/665; C09K 8/68; C09K 8/845; C09K 8/86; C09K 8/88; C09K 8/905; C09K 8/72; C09K 2208/10

See application file for complete search history.

(56) References Cited

U.S. PATENT DOCUMENTS

| | | | |
|---|---|---|---|
| 3,506,070 A | 4/1970 | Jones | |
| 3,613,786 A | 10/1971 | Jones et al. | |
| 3,623,553 A | 11/1971 | Burdge | |
| 3,740,343 A | 6/1973 | Jones | |
| 3,885,628 A | 5/1975 | Reed et al. | |
| 3,981,361 A | 9/1976 | Healy | |
| 4,240,504 A | 12/1980 | Reed | |
| 4,328,106 A | 5/1982 | Harrar et al. | |
| 4,348,462 A | 9/1982 | Chung | |
| 4,390,068 A | 6/1983 | Patton et al. | |
| 4,715,986 A | 12/1987 | Grüning et al. | |
| 4,892,146 A | 1/1990 | Shen | |
| 5,168,082 A | 12/1992 | Matchett | |
| 5,381,863 A | 1/1995 | Wehner | |
| 6,863,985 B2 | 3/2005 | Stark | |
| 7,033,975 B2 | 4/2006 | Baran et al. | |
| 7,101,616 B2 | 9/2006 | Arney et al. | |

(Continued)

FOREIGN PATENT DOCUMENTS

| | | |
|---|---|---|
| CN | 101735787 A | 6/2010 |
| CN | 102838981 A | 12/2012 |

(Continued)

OTHER PUBLICATIONS

Lucas et al, Functionalized silica nanoparticles within multicomponent oil/brine interfaces: A study in molecular dynamics, Journal of physical chemistry C, 2016, 120, 6787-6795.*
Bjorkegren et al, Hydrophilic and hydrophobic modifications of colloidal silica particles for Pickering emulsions, Journal of colloidal and interface science, 2016, 487, 250-257.*
Bjorkegren, et al, Functionalization and characterization of aqueous silica sols and their application in picketing emulsions, Thesis, 2016, 16-17.*
Final Office Action dated Aug. 19, 2019, in U.S. Appl. No. 16/179,676.
Non-Final Office Action dated Nov. 5, 2019, in U.S. Appl. No. 16/141,824.

(Continued)

*Primary Examiner* — Kumar R Bhushan
(74) *Attorney, Agent, or Firm* — Nixon & Vanderhye, PC

(57) ABSTRACT

A hydrocarbon formation treatment micellar solution fluid and its use in treating underperforming hydrocarbon formations is described and claimed. A hydrocarbon formation treatment micellar solution fluid wherein the micellar solution fluid comprises water, a non-terpene oil-based moiety, a brine resistant aqueous colloidal silica sol; and optionally a terpene or a terpenoid, wherein the brine resistant aqueous colloidal silica sol has silica particles with a surface that is functionalized with at least one moiety selected from the group consisting of a hydrophilic organosilane, a mixture of hydrophilic and hydrophobic organosilanes, or a polysiloxane oligomer, wherein the brine resistant aqueous colloidal silica sol passes at least two of three of these brine resistant tests: API Brine Visual, 24 Hour Seawater Visual and API Turbidity Meter, and wherein, when a terpene or terpenoid is present, the ratio of total water to terpene or terpenoid is at least about 15 to 1.

13 Claims, No Drawings

(56) References Cited

U.S. PATENT DOCUMENTS

| | | |
|---|---|---|
| 7,216,712 B2 | 5/2007 | Dalton |
| 7,380,606 B2 | 6/2008 | Pursley et al. |
| 7,482,310 B1 | 1/2009 | Reese et al. |
| 7,544,726 B2 | 6/2009 | Greenwood |
| 7,553,888 B2 | 6/2009 | Greenwood et al. |
| 8,101,812 B2 | 1/2012 | Fan et al. |
| 8,272,442 B2 | 9/2012 | Fan et al. |
| 8,404,107 B2 | 3/2013 | Fan et al. |
| 8,522,876 B2 | 9/2013 | Fan et al. |
| 8,685,234 B2 | 4/2014 | Fan et al. |
| 9,068,108 B2 | 6/2015 | Hill et al. |
| 9,181,468 B2 | 11/2015 | Fan et al. |
| 9,321,955 B2 | 4/2016 | Hill et al. |
| 9,428,683 B2 | 8/2016 | Hill et al. |
| 9,464,223 B2 | 10/2016 | Champagne et al. |
| 9,505,970 B2 | 11/2016 | Vaughn et al. |
| 9,512,352 B2 | 12/2016 | Roddy et al. |
| 9,522,876 B2 | 12/2016 | Winters et al. |
| 9,685,234 B2 | 6/2017 | Balluchi et al. |
| 9,708,525 B2 | 7/2017 | Suresh et al. |
| 9,725,999 B2 | 8/2017 | Castrogiovanni et al. |
| 9,790,414 B2 | 10/2017 | Champagne et al. |
| 9,850,418 B2 | 12/2017 | Champagne et al. |
| 9,868,893 B2 | 1/2018 | Saboowala et al. |
| 9,884,988 B2 | 2/2018 | Dismuke et al. |
| 10,113,406 B1 | 10/2018 | Gomaa et al. |
| 10,160,682 B2 | 12/2018 | Mehta et al. |
| 10,377,942 B2 | 8/2019 | Southwell et al. |
| 10,557,078 B2 | 2/2020 | Southwell |
| 10,563,117 B2 | 2/2020 | Southwell et al. |
| 10,570,331 B2 | 2/2020 | Southwell et al. |
| 10,570,715 B2 | 2/2020 | Babcock et al. |
| 2003/0220204 A1 | 11/2003 | Baran et al. |
| 2004/0077768 A1 | 4/2004 | Greenwood |
| 2004/0097600 A1 | 5/2004 | Greenwood et al. |
| 2004/0102529 A1 | 5/2004 | Campbell et al. |
| 2006/0260815 A1 | 11/2006 | Dahanayake |
| 2007/0238088 A1 | 10/2007 | Rubinsztajn et al. |
| 2008/0289828 A1 | 11/2008 | Hutchins |
| 2010/0096139 A1 | 4/2010 | Holcomb et al. |
| 2010/0147515 A1 | 6/2010 | Hughes et al. |
| 2011/0220360 A1 | 9/2011 | Lindvig et al. |
| 2012/0024530 A1 | 2/2012 | Todd et al. |
| 2012/0168165 A1 | 7/2012 | Holcomb et al. |
| 2012/0175120 A1 | 7/2012 | Holcomb et al. |
| 2013/0341020 A1 | 12/2013 | Nguyen et al. |
| 2014/0008067 A1 | 1/2014 | Roddy et al. |
| 2014/0116695 A1 | 5/2014 | Maghrabi et al. |
| 2014/0162911 A1 | 6/2014 | Monastiriotis |
| 2014/0262288 A1 | 9/2014 | Penny et al. |
| 2014/0284053 A1 | 9/2014 | Germack |
| 2014/0332218 A1 | 11/2014 | Castrogiovanni et al. |
| 2014/0338906 A1 | 11/2014 | Monastiriotis et al. |
| 2014/0338911 A1 | 12/2014 | Hill et al. |
| 2014/0374095 A1 | 12/2014 | Ladva et al. |
| 2015/0068744 A1 | 3/2015 | Welton |
| 2015/0068755 A1 | 3/2015 | Hill et al. |
| 2015/0218435 A1 | 8/2015 | Suresh et al. |
| 2015/0268370 A1 | 9/2015 | Johnston et al. |
| 2015/0292308 A1 | 10/2015 | Conway |
| 2016/0017204 A1 | 1/2016 | Hill et al. |
| 2016/0068664 A1 | 3/2016 | Suemura et al. |
| 2016/0137907 A1* | 5/2016 | Vo .......................... C09K 8/68 507/234 |
| 2016/0194550 A1 | 7/2016 | Hill et al. |
| 2016/0362594 A1 | 12/2016 | Rojas |
| 2016/0369158 A1 | 12/2016 | Patino |
| 2017/0114613 A1 | 4/2017 | Lecerf et al. |
| 2017/0306219 A1 | 10/2017 | Quintero |
| 2018/0291255 A1 | 10/2018 | Southwell |
| 2018/0291261 A1 | 10/2018 | Southwell et al. |
| 2019/0048251 A1 | 2/2019 | Agrawal et al. |
| 2019/0078015 A1 | 3/2019 | Southwell et al. |
| 2019/0078016 A1 | 3/2019 | Southwell et al. |
| 2019/0093462 A1 | 3/2019 | Watts et al. |
| 2019/0136123 A1 | 5/2019 | Holcomb et al. |
| 2019/0345375 A1 | 11/2019 | Nguyen et al. |
| 2019/0382645 A1 | 12/2019 | Southwell et al. |
| 2020/0123435 A1 | 4/2020 | Southwell |
| 2020/0140748 A1 | 5/2020 | Southwell et al. |

FOREIGN PATENT DOCUMENTS

| | | | |
|---|---|---|---|
| CN | 106085401 A | | 11/2016 |
| EP | 2465911 | | 6/2002 |
| EP | 1509676 | | 3/2005 |
| EP | 1818693 | | 8/2007 |
| EP | 2617786 A1 | | 7/2013 |
| JP | 60-219288 | | 11/1985 |
| JP | H01-035157 | | 7/1989 |
| JP | H01234468 A | | 9/1989 |
| JP | H03 31380 | | 2/1991 |
| JP | H05-086989 | | 12/1993 |
| JP | H10111544 A | | 4/1998 |
| JP | 2003-516462 | | 5/2003 |
| JP | 2004150859 | * | 5/2004 |
| JP | 2005-526887 | | 9/2005 |
| JP | 4033970 B2 | | 1/2008 |
| JP | 5026264 B2 | | 9/2012 |
| KR | 101872020 B1 | | 6/2018 |
| WO | WO 1995/011280 | | 4/1995 |
| WO | 01/42387 | | 6/2001 |
| WO | 03/100214 | | 12/2003 |
| WO | WO 2003/100214 | | 12/2003 |
| WO | WO 2005018300 A2 | | 3/2005 |
| WO | 2009044912 A1 | | 4/2009 |
| WO | WO 2010/103020 | | 9/2010 |
| WO | WO 2012/036210 A1 | | 3/2012 |
| WO | 2013192634 A2 | | 12/2013 |
| WO | WO 2014/153102 A1 | | 9/2014 |
| WO | 2014176188 A1 | | 10/2014 |
| WO | WO 2014/201367 A1 | | 12/2014 |
| WO | WO 2014/204709 A2 | | 12/2014 |
| WO | WO 2016/040742 | | 3/2016 |
| WO | WO 2016/205289 | | 12/2016 |
| WO | 2017011328 A1 | | 1/2017 |
| WO | WO 2017/023665 | | 2/2017 |
| WO | 2017062086 A1 | | 4/2017 |
| WO | WO 2018/004560 A1 | | 1/2018 |
| WO | WO 2018/048019 A1 | | 5/2018 |
| WO | 2018157099 A1 | | 8/2018 |
| WO | 2018187550 A1 | | 10/2018 |
| WO | 2018187563 A1 | | 10/2018 |
| WO | 2019054414 A1 | | 3/2019 |
| WO | WO 2019054414 A1 | | 3/2019 |

OTHER PUBLICATIONS

Office Action dated Jul. 12, 2019 in corresponding U.S. Appl. No. 15/946,252, filed Apr. 5, 2018.

Final Office Action dated Jun. 18, 2019 in corresponding U.S. Appl. No. 16/129,688, filed Sep. 12, 2018.

Final Office Action dated Jun. 18, 2019 in corresponding U.S. Appl. No. 16/129,705, filed Sep. 12, 2018.

Notice of Allowance dated Jun. 24, 2019 in corresponding U.S. Appl. No. 15/946,338, filed Apr. 5, 2018.

Technical Data Sheet of Aerosil R972 downloaded on Jun. 12, 2019.

Final Office Action dated Oct. 23, 2020, in U.S. Appl. No. 16/721,281.

Non Final Office Action dated Apr. 27, 2020, in U.S. Appl. No. 16/721,281.

https://pubchem.ncbi. nlm.nih.gov/compound/2-_3_ 4-Epoxycyclohexyl_ ethyltriethoxysilane downloaded on Apr. 21, 2020.

https://en.wikipedia.org/wiki/Isopropyl_alcohol downloaded on Oct. 20, 2020.

An English translation of Office Action issued in a corresponding JP application, JP 2020-0504272, dated Sep. 28, 2020.

Final Office Action in U.S. Appl. No. 15/946,252, dated Dec. 13, 2019.

Final Office Action dated Jan. 4, 2019, in U.S. Appl. No. 15/946,252.

Non-Final Office Action dated Jan. 31, 2019, in U.S. Appl. No. 16/179,676.

(56) References Cited

OTHER PUBLICATIONS

Non-Final Office Action dated Feb. 27, 2019, in U.S. Appl. No. 16/129,688.
Non-Final Office Action dated Feb. 28, 2019, in U.S. Appl. No. 16/129,705.
Final Office Action dated Mar. 20, 2019, in U.S. Appl. No. 16/141,824.
A Search Report dated Oct. 12, 2018 in Great Britain Application No. GB1811749.9 (3 pages).
Alomair, O.A., et al., "Nanofluids Application for Heavy Oil Recovery" SPE International, SPE-171S39-MS, Society of Petroleum Engineers (Oct. 2014).
Amendment and Response to Office Action with Declaration Under 37 C.F.R. §1.132 filed Jan. 11, 2019 in U.S. Appl. No. 15/946,338.
Aminzadeh, B., et al., "Influence of Surface-Treated Nanoparticles on Displacement Patterns During CO Injection," SPE Annual Technical Conference and Exhibition, 20 pages (Jan. 2013).
Carpenter, "Modeling of Production Decline Caused by Fines Migration in Deepwater Reservoirs" Journal of Petroleum Technology, 75-77 (Feb. 2018).
Denney, "Nanosized Particles for Enhanced Oil Recovery" Journal of Petroleum Technology, 54-46 (Jan. 2011).
EPA, "Method 180.1: Determination of Turbidity by Nephelometry," (Aug. 1993).
Extended European Search Report dated Jan. 8, 2018, in EP Application No. 17194608.0 (6 pages).
International Search Report and Written Opinion for International Application No. PCT/JP2017/037208, European Patent Office, The Hague, dated Jun. 5, 2018, 8 pages.
International Search Report and Written Opinion for International Application No. PCT/US2018/052736, European Patent Office, The Hague, dated Dec. 12, 2018, 9 pages.
International Search Report and Written Opinion for International Application No. PCT/US2018/058954, European Patent Office, The Hague, dated Feb. 13, 2019, 12 pages.
Jurinak, J.J., et al., "Oilfield Applications of Colloidal Silica Gel," SPE Production Engineering, 6 (4):406-412 (Nov. 1991), XP055551121.
Li, L., et al., "Gas Selection for Huff-n-Puff EOR in Shale Oil Reservoirs Based upon Experimental and Numerical Study," Society of Petroleum Engineers, SPE-185066-MS, 15 pages (2017).
Li, L., et al., "Optimization of Huff-n-Puff Gas Injection to Enhance Oil Recovery in Shale Reservoirs," Society of Petroleum Engineers, SPE-180219-MS, 18 pages (2016).
Miller, B.J., et al., "Field Case: Cyclic Gas Recovery for Light Oil-Using Carbon Dioxide/Nitrogen/Natural Gas," Society of Petroleum Engineers, SPE 49169, 7 pages (1998).
Wilson, A., "Field Trials of Reservoir Nanoparticles Reveal Stability, High Rates of Recovery," Journal of Petroleum Technology, 64 (11):92-99 (Nov. 2012).
Palmer, F.S., et al., "Design and Implementation of Immiscible Carbon Dioxide Displacement Projects (CO2 Huff-Puff) in South Louisiana," Society of Petroleum Engineers, SPE 15497, 10 pages (1986).
Shafiq, M.U., et al., "Sandstone Matrix Acidizing Knowledge and Future Development," Journal of Petroleum Exploration and Production Technology, 7 (4):1205-1216 (Dec. 2017).
Skauge,T., et al., "Nano-sized Particles for EOR" SPE International, SPE 129933, Society of Petroleum Engineers (Apr. 2010).
Syfan, F.E., et al., "Enhancing Delaware Basin Stimulation Results Using Nanoparticle Dipersion Technology," Society of Petroleum Engineers, SPE-189876-MS, 24 pages (2018).
Wang et al., "Waterless fracturing technologies for unconventional reservoirs—opportunities for liquid nitrogen" Journal of Natural Gas Science and Engineering, 35:160-174 (2016).
Wasan, D., et al., "Spreading of Nanofluids on Solids," Nature, 423:156-159 (May 2003).
Wei et al., "Mechanisms of N2 and CO2 Assisted Steam Huff-Puff Process in Enhancing Heavy Oil Recovery: A Case Study Using Experimental and Numerical Simulation," Society of Petroleum Engineers, SPE-183871-MS, 12 pages (2017).

Partial English translation of title page and claims of Chinese Publication No. 101735787 A, published Jun. 16, 2010.
Partial English translation of title page and claims of Chinese Publication No. 102638981 A, published Dec. 26, 2012.
Partial English translation of title page and claims of Chinese Publication No. 106085401 A, published Nov. 6, 2016.
English translation of the Written Opinion for International Application No. PCT/JP2018/033831, Japan Patent Office, dated Nov. 13, 2018, 6 pages.
Written Opinion for International Application No. PCT/JP2018/033831, Japan Patent Office, dated Nov. 13, 2018, 5 pages.
English machine translation of Korean Patent Publicaton No. 101872020 B1, published Jun. 27, 2018.
Non-Final Office Action dated Sep. 10, 2018, in U.S. Appl. No. 15/946,252 (10 pages).
Non-Final Office Action dated Jun. 5, 2018, in U.S. Appl. No. 15/946,338 (16 pages).
Sears, "Determination of Specific Surface Area of Colloidal Silica by Titration with Sodium Hydroxide", Analytical Chemistry, 28:12, pp. 1981-1983 (Dec. 1956).
English machine translation of Japanese Patent Publication No. H01-035157, published Jul. 24, 1989.
English machine translation of Japanese Patent Publication No. JP H05-086989, published Dec. 15, 1993.
A Non-Final Office Action dated Sep. 10, 2018, in a corresponding U.S. Appl. No. 15/946,252 (10 pages).
An International Search Report dated Aug. 1, 2018, in a corresponding International Patent Application No. PCT/US2018/026227 (15 pages).
Estephan et al., "Zwitterion-Stabilized Silica Nanoparticles: Toward Nonstick Nano", Langmuir, vol. 26, No. 22, Nov. 16, 2010; 16884-16889 (6 pages).
Bjorkegren, et al., "Hydrophilic and hydrophobic modifications of colloidal silica particles for Pickering emulsions", Journal of Colloid and Interface Science, Academic Press, Inc, US, vol. 487, Oct. 15, 2016; 250-257.
Bjorkegren, "Functionalization and characterization of aqueous silica sols and their application in Pickering emulsions", Jan. 1, 2016, XP055492689, Retrieved from the Internet, www://publications.lib.chalmers.se/records/fulltext/246587/246587.pdf, pp. 1-34 and 7 page index (41 pages).
Bjorkegren, et a., "Surface activity and flocculation behavior polyethylene glycol-functionalized silica nanoparticles", Journal of Colloid and Interface Science, Academic Press,Inc, US, vol. 452, Apr. 27, 2015, 215-223 (9 pages).
De Lara et al., "Functionalized Silica Nanoparticles within Multicomponent Oil/Brine Interfaces: A Study in Molecular Dynamics", Journal of Physical Chemistry C, vol. 120, No. 12, Mar. 22, 2016, 6787-6795 (9 pages).
An Internationl Search Report dated Aug. 1, 2018, in a corresponding International Patent Application No. PCT/US2018/026245 (14 pages).
Brunel, "Functionalized micelle-templated silicas (MTS) and their use as catalysts for fine chemicals", Microporous and Mesoporous Materials, vol. 27, No. 2-3, Feb. 1, 1999, 329-344 (16 pages).
Farooqui et al., "Improvement of the Recovery Factor Using Nano-Metal Particles at the Late Stages of Cyclic Steam Stimulation", Society of Petroleum Engineers, XP-002776733, SPE-174478-MS, Jun. 11, 2015.
Ju et al., "Enhanced Oil Recovery by Flooding with Hydrophilic NanoParticles", China Particuology vol. 4, No. 1, 41-46, 2006.
Goodwin et al., "Functionalization of Colloidal Silica and Silica Surfaces via Silylation Reactions", Colloid Polym Sci 268:766-777 (1990).
Zhang, et al., "Foams and Emulsions Stabilized with Nanoparticles for Potential Conformance Control Applications", SPE International Symposium on Oilfield Chemistry held in the Woodlands, Texas, USA, Apr. 20-22, 2009.
McElfresh et al., "Application of Nanofluid Technology to Improve Recovery in Oil and Gas Wells", SPE International Oilfield Nanotechnology Conference held in Noordwijk, The Netherlands, Jun. 12-14, 2012.

(56) References Cited

OTHER PUBLICATIONS

Hoelscher et al., "Application of NanoTechnology in Drilling Fluids", SPE International Oilfield Nanotechlogy Conference held in Noordwijk, The Netherlands, Jun. 12-14, 2012.
Hendraningrat et al., "A Corefield Investigation of Nanofluid Enhanced Oil Recovery in Low-Medium Permeability Berea Sandstone", SPE International Symposium on Oilfield Chemistry held in the Woodlands, Texas, USA, Apr. 8-10, 2013.
Arkles, "Hydrophobicity, Hydrophilicity and Silanes", Paint & Coatings Industry Magazine, Oct. 2006.
European Search Report dated Jul. 31, 2017 in European Patent Application No. 17166435.2 (8 pages).
European Search Report dated Jul. 31, 2017 in European Patent Application No. 17166443.6 (7 pages).
European Search Report dated Jul. 31, 2017 in European Patent Application No. 17166426.1 (7 pages).

* cited by examiner

HYDROCARBON FORMATION TREATMENT MICELLAR SOLUTIONS

CROSS-REFERENCE TO RELATED PATENT APPLICATIONS

This Patent Application is a continuation of U.S. application Ser. No. 16/453,087, filed 26 Jun. 2019, which claims priority to U.S. patent application Ser. No. 15/946,338, filed 5 Apr. 2018, now U.S. Pat. No. 10,377,942, "Hydrocarbon Formation Treatment Micellar Solutions", which claims priority to U.S. Provisional Patent Application No. 62/482,429, filed 6 Apr. 2017, "Brine Resistant Silica Sol"; U.S. Provisional Patent Application No. 62/482,470, filed 6 Apr. 2017, "Hydrocarbon Treatment Fluid"; and U.S. Provisional Patent Application No. 62/482,461, filed 6 Apr. 2017, "Surface Functionalized Colloidal Silica with Enhanced Stability," the entire contents of each of which are hereby incorporated by reference.

FIELD OF THE INVENTION

The present invention relates to hydrocarbon formation treatment micellar solution that include surface treated aqueous colloidal silica sol having excellent stability in brine.

BACKGROUND OF THE INVENTION

For many years, petroleum and/or natural gas has been recovered from subterranean reservoirs by using drilled wells and production equipment. Oil and natural gas are found in, and produced from, porous and permeable subterranean formations, or reservoirs. These subterranean formations are referred to as "hydrocarbon formations" as typically oil and gas are found in proximity to each other underground. The porosity and permeability of the formation determine its ability to store hydrocarbons, and the facility with which the hydrocarbons can be extracted from the formation.

When selecting/using a fluid to be used in the treatment of an oil and/or gas well, it is important for the fluid to have the right combination of additives and components to achieve the necessary characteristics of the specific end-use application. A primary goal amongst many aspects of hydrocarbon formation treatment is to optimize recovery of oil and/or gas from the formation. In some circumstances, surfactant solutions or microemulsions are chosen to treat a hydrocarbon formation for variable technical reasons. However, in part because the microemulsion used during the operation of an oil and/or gas well are often utilized to perform several tasks simultaneously, achieving necessary to optimal characteristics of the treatment fluid is not always easy.

Micelles

Micelles are typically defined as a supramolecular assembly of surfactant molecules dispersed in a liquid medium wherein the surfactant molecules are comprised of a dual structure where one portion of the surfactant molecule is considered hydrophilic (water loving, polar) and another portion of the molecule is considered hydrophobic (lipophilic, fat or oil loving).

Surfactants can be organized into different classes including anionic, cationic, non-ionic, and amphoteric. All classes include this relative hydrophilic/hydrophobic dual nature. When dispersed in water in favorable conditions of concentration and temperature, micelles of surfactants may form where hydrophilic "head" regions are in contact with the surrounding aqueous solvent, sequestering the hydrophobic molecular regions in the micelle center away from water.

A micellar fluid may be described as a fluid performing a specific function or combination of functions where one function is performed by such micellar supramolecular assemblies that may comprise: surfactant molecules of single or multiple classes, co-solvents, oil phase materials, and preferably brine-resistant colloidal particles utilizing a hydrophilic or a combination of hydrophilic and hydrophobic surface functionalization on the particle surface.

Microemulsions

In contrast to "micellar fluids" microemulsions are described as clear, thermodynamically stable, isotropic liquid mixtures of oil phase, water phase, and surfactant, frequently in combination with a cosurfactant or cosolvent. The aqueous phase may contain salt(s) and/or other ingredients, and the oil phase may be a complex mixture of different hydrocarbons and olefins.

In contrast to ordinary emulsions, microemulsions form upon simple mixing of the components and do not require the high shear conditions generally used in the formation of ordinary emulsions.

The three basic types of microemulsions are
(A) direct (oil dispersed in water, o/w),
(B) reversed (water dispersed in oil, w/o), and
(C) bi-continuous.

Typical dispersed domain diameter in a microemulsion may be approximately 1-100 nm and more typically 1-50 nm, the small domain size contributing to optical clarity.

In contrast to a microemulsion, a micellar fluid may not be clear, thermodynamically stable, isotropic, or contain an oil phase. A micellar fluid may have dispersed domain sizes in excess of 50 nm and may contain other phases of materials within or at the surface of the dispersed domain such as brine-resistant colloidal silica (solid phase).

The use of treatment (aka "remediation") microemulsions to recover oil and gas from hydrocarbon formations that have a reduced output is well known. Several different types of fluid mixtures have been disclosed in the prior art for improving oil recovery in hydrocarbon-bearing subterranean formations in remediation, fracturing, stimulation, completion, and production.

U.S. Pat. No. 3,981,361, "OIL RECOVERY METHOD USING MICROEMULSIONS", issued 21 Sep. 1976, describes and claims a method for recovering oil from subterranean formations using microemulsions. The fluid is compounded from an oil, an aqueous medium, and a surfactant, and its parameters are varied to form volumetric ratios of oil to surfactant in the fluid and/or water to surfactant in the fluid greater than 0.5. Preferably, the volumetric ratios will be greater than 2.0. Among the parameters which can be adjusted to change these volumetric ratios include the salinity of the aqueous medium, the temperature of the fluid system, the chemical structure of the surfactant, the chemical structure of any cosurfactant included in the fluid, the degree of aromaticity of the oil, and composition of dissolved solids in the aqueous medium. In one preferred embodiment of the invention an oil is chosen which has physical and chemical characteristics substantially the same as the formation oil. The aqueous medium has physical and chemical characteristics substantially the same as the formation water. A surfactant which has a chemical structure which will form a fluid having volumetric ratios of oil to surfactant and/or of water to surfactant greater than 0.5 is selected for inclusion in the fluid system. The oil; aqueous medium; and surfactant, determined in accordance with the teachings of this invention, form a class of microemulsion which is effective in recovering oil from subterranean formations of interest. All microemulsions within the class will be effective for recovering oil from the formation. Oil is recovered by compounding a fluid within the class and injecting this fluid into the formation.

U.S. Pat. No. 3,885,628, "RECOVERY OF OIL USING MICROEMULSIONS", issued 27 May 1975, describes and claims the recovery of crude oil in a subterranean formation through the injection of at least one phase formed from a composition within the multiphase region of an oil-water-surfactant ternary diagram. One embodiment includes the injection of two or more mutually immiscible phases which would be in phase equilibrium within the multiphase region in the ternary diagram of a fluid system, at least one of the phases being a fluid. Low interfacial tensions exist between the immiscible phases in equilibrium. Where one of the phases in equilibrium comprises predominantly oil or predominantly water, in a further embodiment the fluid phase in equilibrium therewith can be injected alone to achieve efficient crude oil recovery. Where there are three phases in equilibrium, one of which comprises predominantly oil and another comprises predominantly water, in a further embodiment the remaining fluid phase in equilibrium therewith can be injected alone to achieve efficient crude oil recovery.

U.S. Pat. No. 4,240,504 "SIMULTANEOUS MICROEMULSION-AQUEOUS PHASE FLOODING PROCESS", issued 23 Dec. 1980, describes and claims a method of enhanced oil recovery wherein an upper-phase or a middle-phase fluid and an immiscible aqueous phase are simultaneously injected into a subterranean formation. The viscosities of the injected phases are adjusted so that the aqueous phase/fluid viscosity ratio approximates the reservoir brine/oil viscosity ratio. The injection rates of the injected phases are such that similar oil, fluid and aqueous phase velocities are achieved in the reservoir. Oil is displaced to a production well and recovered.

U.S. Pat. No. 7,380,606, "COMPOSITION AND PROCESS FOR WELL CLEANING", issued 3 Jun. 2008, describes and claims a well treatment fluid that is formed by combining a solvent-surfactant blend with a carrier fluid. In preferred embodiments, the solvent-surfactant blend includes a surfactant and a solvent selected from the group consisting of terpenes and alkyl or aryl esters of short chain alcohols. The disclosed well treatment fluid can be used in well remediation, stimulation and hydrogen sulfide mitigation operations. Additionally, the well treatment fluid can be used in the production of benzothiophenes through interaction with hydrogen sulfide.

U.S. Pat. No. 8,101,812, "Extraction of Hydrocarbons from Hydrocarbon-Containing Materials", issued on 24 Jan. 2012, describes and claims a method of extracting hydrocarbon-containing organic matter from a hydrocarbon-containing material, comprising the steps of: providing a first liquid consisting essentially of a turpentine liquid alone or a combination of a turpentine liquid and a turpentine-miscible second liquid wherein the ratio of said turpentine liquid to said turpentine-miscible liquid is greater than or equal to 1:1; contacting a hydrocarbon-containing material with said first liquid to form an extraction mixture; extracting said hydrocarbon material into said turpentine liquid; and separating said extracted hydrocarbon material from a residual material not extracted.

U.S. Pat. No. 8,272,442, "In Situ Extraction of Hydrocarbons From Hydrocarbon-Containing Materials", issued on 25 Sep. 2012, describes and claims a method of extracting hydrocarbon-containing organic matter from a hydrocarbon-containing material, comprising a viscous liquid, liquid or gaseous fossil fuel material selected from heavy crude oil, crude oil, natural gas, or a combination thereof, the method comprising: providing a hydrocarbon-extracting liquid consisting essentially of turpentine liquid alone or a combination of a turpentine liquid and a turpentine-miscible second liquid; contacting heavy crude oil, crude oil, natural gas, or a combination thereof in-situ in an underground formation containing said fossil fuel material, with said hydrocarbon-extracting liquid, to form an extraction mixture so as to extract hydrocarbon-containing organic matter from said heavy crude oil, crude oil, natural gas, or a combination thereof into said hydrocarbon-extracting liquid and form an extraction liquid; removing said extraction liquid from said formation, the extraction liquid comprising said turpentine liquid containing the extracted hydrocarbon-containing organic matter; and separating said extracted hydrocarbon-containing organic matter from a residual material not extracted.

U.S. Pat. No. 8,404,107, "Extraction of Hydrocarbons from Hydrocarbon-Containing Materials", issued on 26 Mar. 2013, describes and claims a method of extracting hydrocarbon-containing organic matter from a hydrocarbon-containing material using a homogenous one-phase hydrocarbon-extracting liquid consisting essentially of a turpentine liquid, comprising the steps of: contacting the hydrocarbon-containing material with a homogenous one-phase hydrocarbon-extracting liquid consisting essentially of a turpentine liquid to form a homogeneous one-phase extraction mixture and a residual material, the homogeneous one-phase extraction mixture comprising at least a portion of the hydrocarbon-containing organic matter extracted into the turpentine liquid, the residual material comprising at least a portion of non-soluble material from the hydrocarbon-containing material that are not soluble in the turpentine liquid; separating the extraction mixture from the residual material; and separating the extraction mixture into a first portion and a second portion, the first portion of the extraction mixture comprising a hydrocarbon product stream comprising at least a portion of the hydrocarbon-containing organic matter, the second portion of the extraction mixture comprising at least a portion of the turpentine liquid.

U.S. Pat. No. 8,522,876, "In Situ Extraction of Hydrocarbons From Hydrocarbon-Containing Materials", issued 3 Sep. 2013, describes and claims a method of extracting hydrocarbon-containing organic matter from a hydrocarbon-containing material, comprising a fossil fuel material selected from oil shale, coal, sands, or a combination thereof, the method comprising: providing a hydrocarbon-extracting fluid consisting essentially of turpentine fluid alone or a combination of a turpentine fluid and a turpentine-miscible second fluid; contacting oil shale, coal, oil sands, or a combination thereof with said hydrocarbon-extracting fluid, to form an extraction or separation mixture so as to extract or separate hydrocarbon-containing organic matter from said oil shale, coal, oil sands, or a combination thereof into said hydrocarbon-extracting fluid and form an extraction fluid comprising said turpentine fluid containing the extracted hydrocarbon-containing organic matter; and separating said extracted hydrocarbon-containing organic matter from a residual material not extracted.

U.S. Pat. No. 8,685,234, "Extraction of Hydrocarbons from Hydrocarbon Containing Materials and/or Processing of Hydrocarbon-Containing Materials", issued 1 Apr. 2014, describes and claims a method for increasing flowability of viscous or immobile hydrocarbon-containing materials in an underground formation, flow line, or storage tank comprising contacting a hydrocarbon-containing material selected from oil (tar) sands, oil shale, natural gas, petroleum gas, heavy crude oil and/or crude oil with a non-aqueous turpentine liquid in an underground formation, flow line, or storage tank; forming a mixture of non-aqueous turpentine liquid and hydrocarbon-containing material having decreased viscosity; and causing said mixture to flow as a one-phase liquid in said underground formation, flow line, or storage tank; and wherein said non-aqueous turpentine liquid comprises α-terpineol, β-terpineol, or a combination thereof.

U.S. Pat. No. 9,181,468, "Extraction of Hydrocarbons from Hydrocarbon-Containing Materials and/or Processing of Hydrocarbon-Containing Materials", issued 10 Nov. 2015, describes and claims a method for increasing flowability of viscous or immobile hydrocarbon-containing materials in an underground formation or a flow line comprising contacting a hydrocarbon-containing material selected from oil (tar) sands, oil shale, natural gas, petroleum gas, heavy crude oil and/or crude oil with a non-aqueous turpentine liquid in said underground formation or flow line; forming a mixture of non-aqueous turpentine liquid and hydrocarbon-containing material having decreased viscosity; and causing said mixture to flow as a one-phase liquid in said underground formation or flow line, wherein said turpentine liquid comprises .alpha.-terpineol, .beta.-terpineol, or a combination thereof.

U.S. Pat. No. 9,428,683, "Methods and Compositions for Stimulating the Production of Hydrocarbons from Subterranean Formations", issued 30 Aug. 2016, describes and claims a method comprising: selecting an emulsion or a microemulsion composition for injection into a wellbore of a well based on a determination of whether formation crude oil is produced or whether formation gas is produced by the well, wherein, when formation crude oil is produced by the well, the emulsion or the microemulsion composition is selected to comprise a terpene having a phase inversion temperature greater than 43° C., water, and a surfactant and the ratio of water to terpene is between about 3:1 and about 1:2; and wherein, when formation gas is produced by the well, the emulsion or the microemulsion is selected to comprise a terpene having a phase inversion temperature less than 43° C., water and a surfactant, and the ratio of water to terpene is between about 3:1 and about 1:2; and injecting the emulsion or the microemulsion into the wellbore.

There is a continued need to develop treatment fluids that can be used to recover more of the oil/gas remaining in a hydrocarbon formation.

One such ingredient in these treatment fluids is colloidal silica. Colloidal silica has many known industrial uses including frictionizing agents for textiles, improvement of polymeric materials including lowering Coefficient of Thermal Expansion, raising of Young's Modulus and Tensile strength, lowering % Elongation, raising electrical insulating properties and resistance to electrical breakdown voltage, production of more efficient catalyst materials, and many other useful functions. Colloidal silica can be used in its original aqueous form or be converted to nonaqueous colloidal dispersions for use in applications that do not tolerate the presence of water.

It has also been reported that colloidal silica can be used in treatment fluids for hydrocarbon formations, specifically in downhole injection treatments to hydrocarbon-bearing subterranean formations for improving oil recovery in downhole applications such as fracturing, stimulation, completion, and remediation.

U.S. Pat. No. 7,544,726 "Colloidal Silica Compositions", issued 9 Jun. 2009, describes and claims a method of producing a stable aqueous silanized colloidal silica dispersion without the presence of any water-miscible organic solvents or optionally comprising one or more water-miscible organic solvents, if present, in a total amount of up to about 5%, by volume of the total volume, said dispersion having a silica content of at least 20 wt % said method comprising: mixing at least one silane compound and colloidal silica particles in an aqueous silica sol having an S-value from 30 to 90 in a weight ratio of silane to silica from 0.003 to 0.2, It also describes and claims a stable aqueous silanized colloidal silica dispersion without the presence of any water-miscible organic solvents or optionally comprising one or more water-miscible organic solvents, if present, in a total amount of up to about 5% by volume of the total volume, said dispersion having a silica content of at least 20 wt %: obtained by mixing colloidal silica particles and at least one silane compound in an aqueous silica sol having an S-value from 30 to 90 in a weight ratio of silane to silica from 0.003 to 0.2. It also describes and claims a stable: aqueous silanized colloidal silica dispersion without the presence of any water-miscible organic solvents or optionally comprising one or more water-miscible organic solvents, if present, in a total amount of up to: about 5% by volume of the total volume, said dispersion having a silica content of at least 20 wt % and having a weight ratio of silane to silica from 0.003 to 0.2, wherein colloidal silica particles are dispersed in a silica sol having an S-value from 30 to 90.

U.S. Pat. No. 7,553,888 "Aqueous Dispersion", issued 30 Jun. 2009, describes and claims a method of producing an aqueous dispersion comprising mixing at least one silane compound and colloidal silica particles to form silanized colloidal silica particles and mixing said silanized colloidal silica particles with an organic binder to form the dispersion. The invention also relates to a dispersion obtainable by the method, and the use thereof.

US published patent application US2012/0168165A1 (abandoned 17 Dec. 2012), "METHOD FOR INTERVENTION OPERATIONS IN SUBSURFACE HYDROCARBON FORMATIONS" describes and claims colloidal silica being added to a fluid containing a wetting agent to enhance wetting of solid surfaces in and around the well and removing a water-block from the well. The wetting agent and colloidal silica combine to produce a wetting of the surfaces of the rock that allows recovery of the excess water near the well (water block).

US published patent application US2012/0175120 (abandoned 29 Nov. 2012), "METHOD FOR INTERVENTION OPERATIONS IN SUBSURFACE HYDROCARBON FORMATIONS", describes and claims colloidal silica added to a fluid containing a wetting agent and the fluid is pumped down a well to enhance wetting of solid surfaces in and around the well before pumping an acid solution down the well. After acid is pumped, a fluid containing colloidal silica and wetting agent is again pumped down the well, leading to improved flow capacity of the well.

US published patent application US2010/096139A1 (abandoned 9 Oct. 2012) "METHOD FOR INTERVENTION OPERATIONS IN SUBSURFACE HYDROCARBON FORMATIONS", describes and claim methods for improved intervention processes in a well. Colloidal silica is added to a fluid containing a wetting agent to enhance wetting of solid surfaces in and around the well, leading to improved flow capacity of the well.

US published patent application US 2016/0017204, "METHODS AND COMPOSITIONS COMPRISING PARTICLES FOR USE IN OIL AND/OR GAS WELLS", now pending, describes a method for treating an oil and/or gas well comprising combining a first fluid and a second fluid to form an emulsion or fluid, wherein the first fluid comprises a plurality of hydrophobic nanoparticles and a non-aqueous phase, wherein the second fluid comprises a surfactant and an aqueous phase, and wherein in the fluid, a portion of the nanoparticles are each at least partially surrounded by surfactant and in contact with at least a portion of the non-aqueous phase; and injecting the emulsion or fluid into an oil and/or gas well comprising a wellbore.

The following patent applications discuss the use of a mixture of colloidal silica in combination with a wetting agent for modifying solid rock surfaces in an aqueous or hydrocarbon-based fluid for injection into a hydrocarbon formation to effect improved oil recovery.

U.S. Pat. No. 7,033,975, "Use of Surface Modified Nanoparticles for Oil Recovery", issued 25 Apr. 2006, now abandoned, describes the use of surface-modified nanoparticles in micellar solution used to recover hydrocarbon from underground formations. The use of surface-modified nanoparticles in such microemulsions provides foams that are stable under pressure yet have a shorter foam lifetime than typical surfactant-stabilized foams after the pressure is released or lowered.

In the article, "Enhanced Oil Recovery by Flooding with Hydrophilic Nanoparticles" by Binshan, Ju; Tailing, Fan; Mingxue, Ma, School of Energy Resource, China University of Geosciences, Beijing 100083, P. R. China, Well-Log Research Center of Shengli Oil-Field, Dongying 257096, P. R. China, the mechanism of enhanced oil recovery using lipophobic and hydrophilic polysilicon (LHP) nanoparticles ranging in size from 10 to 500 nm for changing the wettability of porous media was analyzed theoretically. A one-dimensional two-phase mathematical model considering the migration and adsorption of LHP and wettability change in reservoir rock was proposed, and a simulator was developed to quantitatively predict the changes in relative and effective permeability of the oil and water phases and the oil recovery in sandstone after water driving. Numerical simulations were conducted to study the distribution of the particle concentration, the reduction in porosity and absolute permeability, the LHP volume retention on pore walls and in pore throats along a dimensionless distance, and oil production performance. In conclusion, oil recovery can obviously be improved by flooding with hydrophilic nanometer powders though permeability declines for the retention of nanoparticles in porous media. It is suggested that an LHP concentration ranging from 0.02 to 0.03 is preferable to enhance oil recovery.

Microemulsions prepared with D-Limonene as the oil-phase in combination with surfactants, cosolvents, and water are commercially available from Flotek under the "Stim-Oil" trademark, www.flotekind.com/index.php/products-and-services/item/402-complex-nano-fluid-technology-suite-stimoil-en.

It is generally well known in oilfield applications that subterranean formations contain large amounts of water containing dissolved salts such as NaCl, $CaCl_2$, KCl, $MgCl_2$ and others. This aqueous salt mixture is typically referred to as brine. Brine conditions for different regions and wells vary widely with different downhole conditions and lithologies. In general, micellar solution used downhole must either tolerate briny conditions or have brine-resistant properties.

Commercially available colloidal silica mixtures suitable for these micellar solutions include the nanoActiv™ HRT product line available from Nissan Chemical America, www.nanoactiv.com. These products use nanosized particles in a colloidal dispersion, which allows the fluid to work by causing a Brownian-motion, diffusion-driven mechanism known as disjoining pressure to produce long efficacy in the recovery of hydrocarbons in conventional and unconventional reservoirs.

While these patent applications explore the use of colloidal silica, including aqueous colloidal silica, in downhole oilfield applications and there are commercial products containing colloidal silica available; none of these patent applications or commercial products address the utility of brine resistant colloidal silica being useful in hydrocarbon formation treatment micellar solution.

SUMMARY OF THE INVENTION

The first aspect of the instant claimed invention is a method of treating a hydrocarbon-containing subterranean formation comprising introducing a micellar solution fluid into the hydrocarbon-containing subterranean, wherein
the micellar solution fluid comprises
a) water
b) a non-terpene oil-based moiety,
c) a brine resistant aqueous colloidal silica sol; and
d) optionally a terpene or a terpenoid,
wherein the brine resistant aqueous colloidal silica sol has silica particles with a surface that is functionalized with at least one moiety selected from the group consisting of a
(i) hydrophilic organosilane,
(ii) a mixture of hydrophilic and hydrophobic organosilanes, and
(iii) polysiloxane oligomer,
wherein the brine resistant aqueous colloidal silica sol passes at least two of three of these brine resistant tests: API Brine Visual, 24 Hour Seawater Visual and API Turbidity Meter, and
wherein, when a terpene or terpenoid is present, the ratio of total water to terpene or terpenoid is at least 15 to 1.

The second aspect of the instant claimed invention is the method of the first aspect of the invention wherein when a terpene or terpenoid is present, the ratio of total water to terpene or terpenoid is at least 30 to 1.

The third aspect of the instant claimed invention is the method of the first aspect of the invention, wherein the brine resistant silica sol passes all three of these brine resistant tests: API Brine Visual, 24 Hour Seawater Visual and API Turbidity Meter.

The fourth aspect of the instant claimed invention is the method of the first aspect of the instant claimed invention, wherein the hydrophilic organosilane monomer unit exhibits a critical surface tension in the range of from about 40 mN/m to about 50 mN/m.

The fifth aspect of the instant claimed invention is the method of the first aspect of the instant claimed invention, wherein the hydrophobic organosilane monomer unit exhibits a critical surface tension in the range of from about 15 mN/m to about 39.5 mN/m.

The sixth aspect of the instant claimed invention is the method of the first aspect of the instant claimed invention, wherein the hydrophilic monomer includes a glycidyl group.

The seventh aspect of the instant claimed invention is a hydrocarbon formation treatment micellar solution fluid wherein
the micellar solution fluid comprises
a) water
b) a non-terpene oil-based moiety,
c) a brine resistant aqueous colloidal silica sol; and
d) optionally a terpene or a terpenoid, wherein the brine resistant aqueous colloidal silica sol has silica particles with a surface that is functionalized with at least one moiety selected from the group consisting of a
i) hydrophilic organosilane,
(ii) a mixture of hydrophilic and hydrophobic organosilanes, or
(iii) polysiloxane oligomer,
wherein the brine resistant aqueous colloidal silica sol passes at least two of three of these brine resistant tests: API Brine Visual, 24 Hour Seawater Visual and API Turbidity Meter, and
wherein, when a terpene or terpenoid is present, the ratio of total water to terpene or terpenoid is at least 15 to 1.

The eighth aspect of the instant claimed invention is the hydrocarbon formation treatment micellar solution fluid of the seventh aspect of the instant claimed invention wherein when a terpene or terpenoid is present, the ratio of total water to terpene or terpenoid is at least 30 to 1.

The ninth aspect of the instant claimed invention is the hydrocarbon formation treatment micellar solution fluid of the seventh aspect of the instant claimed invention wherein the brine resistant silica sol passes all three of these brine resistant tests: API Brine Visual, 24 Hour Seawater Visual and API Turbidity Meter.

The tenth aspect of the instant claimed invention is the hydrocarbon formation treatment micellar solution fluid of the seventh aspect of the instant claimed invention wherein the hydrophilic organosilane monomer unit exhibits a critical surface tension in the range of from about 40 mN/m to about 50 mN/m and wherein the hydrophobic organosilane monomer unit exhibits a critical surface tension in the range of from about 15 mN/m to about 39.5 mN/m.

In an embodiment, the oligomer is prepared from a solution that includes a molar ratio of a hydrophilic monomer unit to a hydrophobic monomer unit in the range of from 1:1 to 30:1.

In an embodiment, the oligomer is prepared from a solution that includes a molar ratio of a hydrophilic monomer unit to a hydrophobic monomer unit in the range of from 2:1 to 15:1.

In an embodiment, the oligomer is prepared from a solution that includes a molar ratio of a hydrophilic monomer unit to a hydrophobic monomer unit in the range of from 3:1 to 12:1.

In an embodiment, the organosilane monomer includes a glycidyl group.

In an embodiment, the aqueous colloidal silica is brine-resistant in both a 10 wt. % API Brine Solution and in Artificial Seawater for at least 24 hours.

In an embodiment, the oligomer includes 2-10 monomer units.

In an embodiment, the oligomer includes 2-5 monomer units.

In an embodiment, the fluid further comprises:
a) one or more surfactants,
b) one or more alcohols,
c) one or more alcohol co-solvents; and
d) water.

In an embodiment, the aqueous colloidal silica has silica particles with a surface that is functionalized with at least one polysiloxane oligomer.

In an embodiment, the polysiloxane oligomer comprises Ingredient A and Ingredient B,
wherein Ingredient A is glycidoxypropyltrimethoxysilane and Ingredient B is selected from the group consisting of one or more of methacryloxypropyltrimethoxysilane, isobutyltrimethoxysilane, vinyltrimethoxysilane, trimethoxy[2-(7-oxabicyclo[4.1.0]hept-3-yl)ethylt-rimethoxysilane and hexamethyldisiloxane.

In an embodiment, the fluid comprises:
(a) a terpene-based oil phase that includes less than about 20.0 wt. % d-limonene,
(b) one or more surfactants selected from the group consisting of anionic surfactants, cationic surfactants, nonionic surfactants and amphoteric surfactants;
(c) an alcohol selected from the group consisting of $C_1$-$C_6$ alcohols;
(d) an alcohol cosolvent;
(e) sufficient amount of water such that the ratio of total water in the fluid to the amount of terpene is at least about 15 to 1 and is preferably at least about 30 to 1; and
(f) a brine resistant surface functionalized colloidal silica.

In an embodiment, the fluid comprises:
(a) a terpenoid based oil phase,
(b) one or more surfactants selected from the group consisting of anionic surfactants, cationic surfactants, nonionic surfactants and amphoteric surfactants;
(c) an alcohol selected from the group consisting of $C_1$-$C_6$ alcohols;
(d) an alcohol cosolvent;
(e) sufficient amount of water such that the ratio of total water in the fluid to the amount of terpene is at least about 15 to 1 and is preferably at least about 30 to 1; and
(f) a brine resistant surface functionalized colloidal silica.

In an embodiment, the surface treatment includes either hydrophilic or a mixture of hydrophilic and hydrophobic organosilane monomer units.

In an embodiment, the surface treatment includes at least a hydrophilic monomer unit and a hydrophobic monomer unit In an embodiment, the surface treatment includes at least a hydrophobic organosilane monomer unit and a hydrophilic organosilane monomer unit.

In an embodiment, the hydrophilic organosilane monomer unit exhibits a critical surface tension in the range of from about 40 mN/m to about 50 mN/m.

In an embodiment, the hydrophobic organosilane monomer unit exhibits a critical surface tension in the range of from about 15 mN/m to about 39.5 mN/m.

In an embodiment, the surface treatment is prepared from a solution that includes a molar ratio of a hydrophilic monomer unit to a hydrophobic monomer unit in the range of from 1:1 to 30:1.

In an embodiment, the surface treatment includes a molar ratio of a hydrophilic monomer unit to a hydrophobic monomer unit in the range of from 2:1 to 15:1.

In an embodiment, the surface treatment includes a molar ratio of a hydrophilic monomer unit to a hydrophobic monomer unit in the range of from 3:1 to 12:1.

In an embodiment, the hydrophilic organosilane monomer includes a glycidyl group.

In an embodiment, the aqueous colloidal silica treated with monomeric organosilanes is brine-resistant in a 10 wt. % API Brine Solution for at least 24 hours.

In an embodiment, the fluid further comprises:
a) one or more surfactants,
b) one or more alcohols,
c) one or more alcohol co-solvents; and
d) a sufficient amount of water such that the ratio of total water in the fluid to the amount of terpene is at least about 15 to 1 and is preferably at least about 30 to 1.

In an embodiment, the aqueous colloidal silica has silica particles with a surface that is functionalized with surface treatment including either hydrophilic or a mixture of hydrophilic and hydrophobic monomer units.

In an embodiment, the surface treatment comprises Ingredient A and Ingredient B, wherein Ingredient A is glycidoxypropyltrimethoxysilane and Ingredient B is selected from the group consisting of one or more of methacryloxypropyltrimethoxysilane, isobutyltrimethoxysilane, vinyltrimethoxysilane, trimethoxy[2-(7-oxabicyclo[4.1.0]hept-3-yl)ethyltrimethoxysilane and hexamethyldisiloxane.

In an embodiment, the fluid comprises:
(a) a terpene-based oil phase that includes less than about 20.0 wt. % d-limonene,
(b) one or more surfactants selected from the group consisting of anionic surfactants, cationic surfactants, nonionic surfactants and amphoteric surfactants;
(c) an alcohol selected from the group consisting of $C_1$-$C_6$ alcohols;
(d) an alcohol cosolvent;
(e) a sufficient amount of water such that the ratio of total water in the fluid to the amount of terpene is at least about 15 to 1 and is preferably at least about 30 to 1; and
(f) a brine resistant colloidal silica surface functionalized with either a hydrophilic organosilane or a mixture of hydrophilic and hydrophobic organosilanes.

In an embodiment, the fluid comprises:
(a) a terpenoid based oil phase,
(b) one or more surfactants selected from the group consisting of anionic surfactants, cationic surfactants, nonionic surfactants and amphoteric surfactants;
(c) an alcohol selected from the group consisting of $C_1$-$C_6$ alcohols;
(d) an alcohol cosolvent;
(e) a sufficient amount of water such that the ratio of total water in the fluid to the amount of terpene is at least about 15 to 1 and is preferably at least about 30 to 1; and
(f) a brine resistant colloidal silica surface-functionalized with either a hydrophilic organosilane or a mixture of hydrophilic and hydrophobic organosilanes.

DETAILED DESCRIPTION OF THE INVENTION

The following definitions are provided to aid those skilled in the art in understanding the detailed description of the present invention.

The term "surfactant" refers to a soluble, or partially soluble compound that reduces the surface tension of liquids, or reduces interfacial tension between two liquids, or a liquid and a solid by congregating and orienting itself at these interfaces.

The term "amphoteric" refers to surfactants that have both positive and negative charges. The net charge of the surfactant can be positive, negative, or neutral, depending on the pH of the solution.

The term "anionic" refers to those surfactants that possess a net negative charge.

The term "cationic" refers to those surfactants that possess a net positive charge.

As used herein, the term "treatment," or "treating," refers to any operation that uses a fluid in conjunction with a desired function and/or for a desired purpose. The term "treatment," or "treating," does not imply any particular action by the fluid or any particular component thereof.

In an embodiment, one component is a "terpene" based liquid that makes up the oil phase. A terpene is derived biosynthetically from units of isoprene, which has the molecular formula $C_5H_8$. The basic molecular formulae of terpenes are multiples of that, $(C_5H_8)_n$ where n is the number of linked isoprene units. This is called the isoprene rule or the $C_5$ rule. The isoprene units may be linked together "head to tail" to form linear chains or they may be arranged to form rings. One can consider the isoprene unit as one of nature's common building blocks. Commercially available terpenes are available online from different websites including buyterpenes.com and www.vertecbiosolvents.com/vertecbio-dlr.

Limonene is a colorless liquid hydrocarbon classified as a cyclic terpene. The more common d-isomer possesses a strong smell of oranges.[1] It is used in chemical synthesis as a precursor to carvone and as a renewables-based solvent in cleaning products. The less common 1-isomer is found in mint oils and has a piney, turpentine-like odor. For purposes of this invention it has been found that a better performing oil-well treatment fluid will be created if the amount of Limonene present in the treatment fluid is less than 0.01 wt. %.

Other terpenes or formulated terpene mixtures are commercially available, including VertecBio™DLR. VertecBio™DLR is a high-powered, environmentally friendly alternative for d-limonene. It has a pleasant fruity odor and is ideal for parts cleaning and degreasing. It cuts through oily materials, adhesives and inks. VertecBio™DLR is available from Vertec Biosolvents, www.vertecbiosolvents.com/vertecbio-dlr In contrast to existing patents, U.S. Pat. Nos. 8,101,812; 8,272,442, 8,404,107, 8,522,876, 8,685,234 and 9,181,468 that teach the :flooding" of an underperforming hydrocarbon containing formation with a non-aqueous terpene, which is typically turpentine, the presence of terpene or terpenoid in the micellar solution fluid is optional, and when terpene- or terpenoid is present, it is present is a very low amount such that the ratio of total water in the fluid to total terpene or terpenoid is at least about 15 to 1 an preferably is at least about 30 to 1.

In another embodiment, non-terpenes are available for the oil phase of the treatment fluid. Non-terpene, oil phase materials include VertecBio™ Gold, which is a methyl soyate material available from Vertec Biosolvents. www.vertecbiosolvents.com/vertecbio-dlr In an embodiment VertecBio™DLR is used in the formulation.

In an embodiment VertecBio™Gold is used in the formulation.

In an embodiment terpene-based and non-terpene-based oil phases are used in combination.

Regarding the surfactant chosen to be used: a range of surfactants can be used including anionic, nonionic, cationic, or amphoteric surfactants including mixtures of these. Surfactants may be selected from the group of commercially available surfactants consisting of ethoxylated nonyl phenol, sodium stearate, sodium dodecyl sulfate, sodium dodecylbenzene sulfonate, alkyl olefin sulfonates, laurylamine hydrochloride, trimethyldodecylammonium chloride, cetyl trimethylammonium chloride, polyethylene oxide alcohol, ethoxylated castor oil, propoxylated castor oil, ethoxylated-propoxylated castor oil, ethoxylated soybean oil, propoxylated soybean oil, ethoxylated-propoxylated soybean oil, ethylene oxide-propylene oxide copolymers, sodium trideceth sulfate, ethoxylated tetramethyl decyne alcohol, alkylphenolethoxylate, Polysorbate 80, ethoxylated or propoxylated polydimethylsiloxane, dodecyl betaine, lauramidopropyl betaine, cocamidopropyl betaine, cocamidopyropyl-2-hydroxypropyl sulfobetaine, alkyl aryl sulfonates, protein-surfactant complexes, fluorosurfactants, polyethyleneoxide alkyl ether phosphates.

Ethylan™ 1206 is a nonionic surfactant—Ethylene Oxide/Propylene Oxide copolymer available commercially, from among other suppliers, AkzoNobel. In an embodiment, the surfactant is a nonionic surfactant, which is a copolymer of ethylene oxide and propylene oxide. www.akzonobel.com A mixture of surfactants can also be used, rather than just one surfactant. Typically, the mixture mostly comprises a large amount of anionic surfactant and a relatively small amount of non-ionic surfactant.

In an embodiment, alkyl olefin sulfonate is the surfactant used in the formulation.

One suitable alkyl olefin surfactant is Calsoft® AOS-40, a 40% solution of sodium $C_{14\text{-}16}$ alpha olefin sulfonate available from Pilot Chemical. www.ulprospector.com/en/na/Cleaners/Detail/920/37364/Calsoft-AOS-40

A mixture of surfactants can also be used, rather than just one surfactant. Typically, the mixture mostly comprises a large amount of anionic surfactant and a relatively small amount of non-ionic surfactant.

In an embodiment, also present in the fluid is a $C_1$-$C_6$ alcohol, an alcohol co solvent and water.

In an embodiment, the alcohol is isopropanol.

In an embodiment, the alcohol cosolvent is ethylene glycol.

A surface treated aqueous colloidal silica is typically added to the formulation. The surface treatment can range anywhere from about 10% to about 100% of the surface being treated. In an embodiment, the surface treatment ranges from about 25% to about 100% of the available surface. In an embodiment, the surface treatment ranges from about 50% to about 100% of the available surface.

Colloidal systems in general, and aqueous colloidal silicas in particular, rely primarily upon electrostatic repulsion between charged silica particles to avoid unwanted or adverse phenomena such as particle agglomeration, flocculation, gelation and sedimentation. This electrostatic repulsion is easily disrupted in briny conditions typically found in subterranean formations. Furthermore, agglomeration/flocculation/gelation/sedimentation of colloidal silica and micellar solution containing colloidal silica in downhole applications would have the potential to damage the well or potentially plug the well entirely. Therefore, application of colloidal silica in downhole applications necessitates imparting brine resistant properties to colloidal silica and micellar solution containing colloidal silica before application. Standard tests for brine stability are disclosed herein.

It is known to be advantageous in different applications to attach organic surface character to the surface of colloidal silica particles of aqueous solution. One such application is latex and emulsion polymerization chemistry, where the addition of surface treated colloidal silica can improve and modify the physical properties of the dried or cured latex coating. The addition of organic surface character to latex coatings can impart stability and shelf life to the colloidal silica component of a latex coating formulation, see previously cited U.S. Pat. No. 7,553,888.

U.S. Pat. No. 7,553,888 "Aqueous Dispersion", issued 30 Jun. 2009, describes and claims a method of producing an aqueous dispersion comprising mixing at least one silane compound and colloidal silica particles to form silanized colloidal silica particles and mixing said silanized colloidal silica particles with an organic binder to form the dispersion. The invention also relates to a dispersion obtainable by the method, and the use thereof.

Other coating applications and coating formulations including both aqueous and nonaqueous systems can be similarly improved by the addition of organic surface character to colloidal silica, see U.S. Pat. No. 4,348,462, "Abrasion Resistant Ultraviolet Light Curable Hard Coating Compositions", issued 7 Sep. 1982, describes and claims a radiation curable coating composition comprising (A) colloidal silica (B) acryloxy or glycidoxy functional silanes (C) non-silyl acrylates and (D) catalytic amounts of UV light sensitive cationic and radical type photoinitiators is provided, which cures to a transparent hard coating exhibiting improved abrasion resistance.

It has been discovered that brine resistance of aqueous colloidal silica can be improved over untreated colloidal silica by addition of certain types of organic surface treatment. It was discovered that colloidal silica brine resistance could be further improved by surface treatment using mixtures of hydrophobic and hydrophilic surface treatment. It was furthermore discovered that use of these brine resistant colloidal systems in formulated micellar solution could improve performance in tests designed to model hydrocarbon recovery from subterranean formations.

There are known ways to modify the surface of colloidal silica:
1. Covalent attachment of Inorganic oxides other than silica.
2. Non-covalent attachment of small molecule, oligomeric, or polymeric organic materials (PEG treatment, amines or polyamines, sulfides, etc.).
3. Covalent attachment of organic molecule including oligomeric and polymeric species:
   a. Reaction with organosilanes/titanates/zirconates/germanates.
   b. Formation of organosilanes/titanate/zirconate/germanate oligomers followed by reaction of these with surface of colloidal silica.
   c. Silanization followed by post-reaction formation of oligomeric/dendritic/hyperbranched/polymeric species starting from colloidal silica surface.
   d. Formation of oligomeric/dendritic/hyperbranched/polymeric silanes/zirconates/titanates followed by reaction to $SiO_2$ surface.

The silica particles included in the aqueous colloidal silica that is used in the brine resistant silica sol may have any suitable average diameter. As used herein, the average diameter of silica particles refers to the average largest cross-sectional dimension of the silica particle. In certain embodiments, the silica particles may have an average diameter of between about 0.1 nm and about 100 nm, between about 1 nm and about 100 nm, between about 5 nm and about 100 nm, between about 1 nm and about 50 nm, between about 5 nm and about 50 nm, between about 1 nm and about 40 nm, between about 5 nm and about 40 nm, between about 1 nm and about 30 nm, between about 5 nm and about 30 nm, or between about 7 nm and about 20 nm.

In some embodiments, the silica particles have an average diameter of less than or equal to about 30 nm, less than or equal to about 25 nm, less than or equal to about 20 nm, less than or equal to about 15 nm, less than or equal to about 10 nm, or less than or equal to about 7 nm. In certain embodiments, the silica particles have an average diameter of at least about 5 nm, at least about 7 nm, at least about 10 nm, at least about 15 nm, at least about 20 nm, or at least about 25 nm. Combinations of the above-referenced ranges are also possible.

Because of the nanometer diameters of the particles another word to describe the silica particles is by calling them nanoparticles.

In certain embodiments, the colloidal silica is commercially available silica (e.g., hydrophobized silica). Commercially available colloidal silica including silica particles of the desired size that are suitable for use in the instant claimed invention are available from Nissan Chemical America Corporation, www.nissanchem-usa.com and Nalco Water, an Ecolab Company, www.ecolab.com/nalco-water.

A common and economical way to add organic surface character to colloidal inorganic oxide particles is reaction of colloidal silica surfaces with organosilanes. Organosilanes of many types and variations can be obtained easily and cheaply as other large volume applications exist for these materials within industrial chemistry. While this method is cheap and simple in application to colloidal silica chemistry, there exist some limitations with-respect-to surface modification.

Limitations include poor solubility of the starting organosilane in the dispersion solvent of colloidal silica which can result in incomplete surface functionalization or unwanted side reaction products. In other instances, successful surface reaction of colloidal silica with the wrong organosilane can result in loss of colloidal stability and agglomeration of the colloidal silica. In the situation of poor organosilane solubility, formation of organosilane oligomers before reaction with colloidal silica surfaces can be advantageous. Prehydrolysis and condensation of organosilanes to form polysiloxane oligomers is well known in the field of sol-gel science. This method is used to produce sol-gel type inorganic binders and primer coatings for sol-gel coating applications.

In some instances, a superior surface functionalization can be achieved by initial oligomerization of organosilanes followed by reaction with colloidal silica. Prehydrolysis and condensation of organosilanes to produce oligomeric polysiloxane materials is a known method-mainly in coating science. See EP 1818693A1, "Anti-Reflective Coatings" by Iler, Osterholtz, Plueddemann. This European Patent Application was filed with a claim to a coating composition comprising (i) surface-modified nano-particles of a metal oxide, (ii) metal oxide-based binder, wherein the weight ratio of metal oxide in (i) to (ii) is from 99:1 to 1:1.

In the case of aqueous colloidal silica, it is the observation of the inventor that surface reaction with organosilanes can have limitations due to solubility of organosilanes. Reaction of aqueous colloidal silica with organosilanes having too much hydrophobic character can be unsuccessful for two main reasons:
  1. The relatively hydrophobic organosilane is not soluble enough in the aqueous system to effectively dissolve and react with the surfaces of aqueous colloidal silica.
  2. The relatively hydrophobic organosilanes are able to dissolve in the aqueous system but after reaction to the colloidal silica surface renders the colloidal silica too hydrophobic to be stable in the aqueous system.

One method to achieve improved reaction of hydrophobic organosilanes with aqueous colloidal silica is prehydrolysis. The prehydrolysis method is described in the reference document: "Silane Coupling Agents", from Shin-Etsu Silicones, March 2015, available from www.shinetsusilicone-global.com/catalog/pdf/SilaneCouplingAgents_e.pdf). The prehydrolysis method relies on hydrolysis reaction of organosilane molecules together to form short polysiloxane type oligomeric chains of organosilane monomeric species. These prehydrolyzed species can display improved aqueous solubility. In the case of relatively hydrophobic organosilanes, prehydrolysis may improve initial water solubility but may not improve the ultimate stability of the reaction product of prehydrolyzed hydrophobic organosilane oligomers with aqueous colloidal silica, due to incompatibility of the final surface-functionalized silica due to too much hydrophobic character.

To form brine resistant silica sols it is recommended to use the method of prehydrolysis of mixtures of hydrophobic silanes with hydrophilic silanes to effect rapid and convenient synthesis of brine-resistant aqueous colloidal systems having a combination of hydrophilic and hydrophobic character.

The method of prehydrolysis of hydrophobic silanes with hydrophilic silanes before reaction with the surface of colloidal silica may allow for introduction of organosilanes molecules to aqueous colloidal silica surfaces that would not otherwise be possible due to excessive hydrophobic character in an aqueous colloidal system. In this way surface treated colloidal silica can be made as hydrophobic as possible, while still remaining stable and dispersed in an aqueous system.

For example, in pure form, vinyltrimethoxysilane is sparingly soluble in water or aqueous colloidal silica. One skilled in the art may use methods or co-solvents to achieve solubilization of vinyltrimethoxysilane by itself into aqueous colloidal silica, but this application to colloidal silica has some difficulties. Vinyltrimethoxysilane, when reacted to the colloidal silica surface, by itself, will impart to the silica surface the nonpolar organic character of vinyl groups, which impart sufficient hydrophobic character to the particles as to destabilize the aqueous colloidal silica and cause the silica to agglomerate and precipitate out of solution or form a gel.

It has been observed by the inventors that addition of certain types of organic surface character improve stability of aqueous colloidal silica in salt/brine solutions. Improvement of brine stability in colloidal silica systems can be found by using the aforementioned strategy of hydrophobic/hydrophilic organosilane combination and adding this combination to the surface of colloidal silica.

One measure of hydrophobicity/hydrophilicity for organosilanes materials is surface tension or critical surface tension. Surface tension values for commercial organosilanes materials may be found in supplier literature materials (such as Gelest, www.gelest.com). Higher surface tension values indicate a more hydrophilic material, conversely lower surface tension values indicate a more hydrophobic material.

As stated in the Arkles' article, "Hydrophobicity, Hydrophilicity and Silanes, Paint & Coatings Industry Magazine, October 2006 on page 3, "Critical surface tension is associated with the wettability or release properties of a solid. . . . Liquids with a surface tension below the critical surface tension ($\gamma c$) of a substrate will wet the surface, . . . continued on page 4 . . . Hydrophilic behavior is generally observed by surfaces with critical surface tensions less than 35 dynes/cm (35 mN/m) . . . Hydrophobic behavior is generally observed by surfaces with critical surface tensions less than 35 dynes/cm (35 mN/m)."

Surface tension values for commercial organosilanes materials may be found in supplier literature materials (such as Gelest, www.gelest.com). Higher surface tension values indicate a more hydrophilic material, conversely lower surface tension values indicate a more hydrophobic material.

| | Critical Surface Tension (mN/m) |
|---|---|
| Glycidoxypropyl Trimethoxysilane | 42.5 |
| Mercaptopropyl Trimethoxy silane | 41 |
| Phenyl Trimethoxy silane | 40 |
| Trimethoxy[2-(7-oxabicyclo[4.1.0]hept-3-yl)ethyl]silane | 39.5 |
| Methacryloxypropyl Trimethoxysilane | 28 |
| Vinyltrimethoxy Silane | 25 |
| Isobutyl Trimethoxy silane | 20.9 ± 3.0* |
| Hexamethyl Disiloxane | 15.9 |

*source www.chemspider.com/Chemical-Structure.79049

In terms of surface-treatment for colloidal silica a practical measure of hydrophilicity/hydrophobicity of an organosilanes is whether aqueous colloidal silica can be effectively treated by the organosilanes, and if the surface treated colloidal dispersion is stable in aqueous or semi-aqueous solution. After surface treatment with an organosilane or its oligomer upon an aqueous or semi-aqueous colloidal silica dispersion the hydrophilic surface treatment will allow for a stable dispersion, while an excessively hydrophobic surface treatment will show signs of instability such as gel or agglomeration.

For this work, it has been found that optimal results are obtained when the hydrophilic organosilane monomer unit exhibits a critical surface tension in the range of 40-50 mN/m.

For this work, it has been found that optimal results are obtained when the hydrophobic organosilane monomer unit exhibits a critical surface tension in the range of 15-39.5 mN/m.

Oligomers prepared by prehydrolysis of organosilanes can be done by following this experimental procedure. Distilled water is brought to pH 3 by addition of hydrochloric acid. 10.0 grams of glycidoxypropyltrimethoxysilane, abbreviated "GPTMS" (sold under the tradename KBM 403 by Shin Etsu Corp.) and 1.0 gram of hydrophobic silane, including, but not limited to, one or more of methacryloxypropyl-trimethoxysilane and phenyltrimethoxysilane and isobutyltrimethoxysilane and hexamethyldisiloxane (sold under the tradename KBM 103 available from Shin Etsu Corp.) and 1.0 gram prepared pH 3 water are added to a 20 mL scintillation vial. A molar shortage of water is chosen to encourage linear polysiloxane oligomer formation. The combination is mixed by shaking the vial, resulting in a hazy mixture/emulsion which changes to clear and transparent upon standing for approximately 10 minutes. Transition from hazy to transparent is attributed to hydrolysis of Si—O—$CH_3$ species to Si—OH species that are more compatible with water. The mixture is allowed to stand for a period of 30 minutes at room temperature to form organosilane oligomer species by condensation of Si—OH groups to form Si—O—Si polysiloxane bonds.

Formation of polysiloxane oligomers is accompanied by an increase in viscosity as measured by Ubbeholde viscometer. Formation of polysiloxane oligomers is also verified by FTIR as measured by ThermoFisher Nicolet iS5 spectrometer. Oligomer formation is confirmed and monitored by reduction/loss of absorption peak at 1080 $cm^{-1}$ assigned to Si—O—C stretching vibration and appearance and broadening of Si—O—Si absorption peaks in the 980 $cm^{-1}$ region. Oligomer formation can also be confirmed by Gel Permeation Chromatography.

This general method of prehydrolysis/condensation is followed for each combination of hydrophilic and hydrophobic organosilanes as well as comparative examples where oligomer formation was desired. Some organosilane combination preparations resulted in precipitates or gelled mixtures and were not used further.

| Ingredient in polysiloxane oligomer | Low | High | Middle | Preferred amount |
|---|---|---|---|---|
| Amount of glycidoxypropyl-trimethoxysilane in oligomer | 9 parts | 11 part | 10 parts | 10 parts |
| Amount of Hydrophobic Silane in oligomer | 1 part | 3 parts | 5 parts | depends |

It has furthermore been observed in model testing that crude oil can be more efficiently removed from downhole rock surfaces by using fluid systems formulated with such brine-resistant aqueous colloidal silica.

In an embodiment, the oligomer includes organosilane monomer units.

In an embodiment, the oligomer includes a first organosilane monomer unit and a second organosilane monomer unit that is different from the first organosilane monomer unit.

In an embodiment, the oligomer includes at least a hydrophilic monomer unit and a hydrophobic monomer unit.

In an embodiment, the oligomer includes at least a hydrophobic organosilane monomer unit and a hydrophilic organosilane monomer unit.

In an embodiment, the hydrophilic organosilane monomer unit exhibits a critical surface tension in the range of from about 40 mN/m to about 50 mN/m.

In an embodiment, the hydrophobic organosilane monomer unit exhibits a critical surface tension in the range of from about 15 mN/m to about 39.5 mN/m.

In an embodiment, the oligomer is prepared from a solution that includes a molar ratio of a hydrophilic monomer unit to a hydrophobic monomer unit in the range of from 1:1 to 30:1.

In an embodiment, the oligomer is prepared from a solution that includes a molar ratio of a hydrophilic monomer unit to a hydrophobic monomer unit in the range of from 2:1 to 15:1.

In an embodiment, the oligomer is prepared from a solution that includes a molar ratio of a hydrophilic monomer unit to a hydrophobic monomer unit in the range of from 3:1 to 12:1.

In an embodiment, the organosilane monomer includes a glycidyl group.

In an embodiment, the aqueous colloidal silica is brine-resistant in both a 10 wt. % API Brine Solution and Artificial Seawater for at least 24 hours.

In an embodiment, the oligomer includes 2-10 monomer units.

In an embodiment, the oligomer includes 2-5 monomer units.

In an embodiment, the fluid further comprises:
a) one or more surfactants,
b) one or more alcohols,
c) one or more alcohol co-solvents; and
d) water, with the amount of water selected such that the ratio of total water in the fluid to total terpene or terpenoid is at least about 15 to 1 and preferably is at least about 30 to 1.

| Fluid Amounts of Liquids Added* |
| --- |
| 30% Terpene or Terpenoid Oil Phase |
| 30% Anionic Surfactant |
| 10% isopropanol |
| 30% Water |

The surfactants, alcohol and amount of water added to the formula is chosen such that the ratio of total water in the fluid to the amount of terpene is at least about 15 to 1, and more preferably is at least about 30 to 1.

The amount of brine resistant surface functionalized aqueous colloidal silica depends upon the utility of the treatment fluid. Typically, the amount of water is reduced to accommodate the amount of aqueous colloidal silica.

In an embodiment, the aqueous colloidal silica has silica particles with a surface that is functionalized with at least one polysiloxane oligomer.

In an embodiment, the polysiloxane oligomer comprises Ingredient A and Ingredient B, wherein Ingredient A is glycidoxypropyltrimethoxysilane and Ingredient B is selected from the group consisting of one or more of methacryloxypropyltrimethoxysilane, isobutyltrimethoxysilane, vinyltrimethoxysilane, trimethoxy[2-(7-oxabicyclo [4.1.0]hept-3-yl)ethyltrimethoxysilane and hexamethyldisiloxane.

In an embodiment, the fluid comprises:
(a) a terpene-based oil phase that includes less than about 20 wt. % d-limonene,
(b) an anionic surfactant selected from the group consisting of alkyl olefin sulfonate surfactants;
(c) an alcohol selected from the group consisting of $C_1$-$C_6$ alcohols;
(d) an alcohol cosolvent;
(e) water; with the amount of water selected such that the ratio of total water in the fluid to total terpene or terpenoid is at least about 15 to 1 and preferably is at least about 30 to 1; and
(f) a brine resistant surface functionalized colloidal silica.

In an embodiment, the fluid comprises:
(a) a terpenoid based oil phase,
(b) an anionic surfactant selected from the group consisting of alkyl olefin sulfonate surfactants;
(c) an alcohol selected from the group consisting of $C_1$-$C_6$ alcohols;
(d) an alcohol cosolvent;
(e) water; and
(f) a brine resistant surface functionalized colloidal silica.

In certain embodiments, the following ingredients are present in the treatment fluid.

| Component | Mass (g) |
| --- | --- |
| VertecBio DLR | 3 |
| AOS-40 | 7.5 |
| Ethylan 1206 | 2 |
| Isopropanol | 1 |
| Water | 2.5 |
| Total | 16 |
| VertecBio DLR | 3 |
| AOS-40 | 7.5 |
| Isopropanol | 1 |
| Water | 2.5 |
| 2-Ethyl-1-hexanol | 1 |
| Total | 15 |

In Other Embodiments, the Following Ingredients are Present:

| Materials: | | Amount (kg): | % |
| --- | --- | --- | --- |
| 1 | VertecBio DLR | 0.315 | 1.10% |
| 2 | VertecBio Gold | 3.61 | 12.65% |
| 3 | AOS-40 | 12.26 | 42.96% |
| 4 | MC-6100 | 3.50 | 12.27% |
| 5 | IPA | 3.90 | 13.67% |
| 6 | DI H2O | 2.95 | 10.34% |
| 7 | E11126 | 2.00 | 7.01% |
| | | 28.535 | 100.00% |

E11126 is a brine-resistant silicasol made from ST-025, available from Nissan Chemical America Corp. and GPTMS Glycidoxypropyltrimethoxysilane In other embodiments, these ingredients are present in the treatment formulation.

| Component | Mass (g) | Mass (g) | Mass (g) |
| --- | --- | --- | --- |
| VertecBio DLR | 0.16 | 0.12 | 0.08 |
| VertecBio Gold | 1.84 | 1.38 | 0.92 |
| AOS-40 | 7.5 | 7.5 | 7.5 |
| Ethylan 1206 | 2 | 2 | 2 |
| Isopropanol | 2 | 2.5 | 3 |
| Water | 2.5 | 2.5 | 2.5 |
| Total | 16 | 16 | 16 |

In other embodiments, the named ingredients are present in the treatment formulation.

| Component | Mass (g) |
| --- | --- |
| VertecBio DLR | 0.16 |
| VertecBio Gold | 1.84 |
| AOS-40 | 6.25 |
| Ethylan 1206 | 1.66 |
| Isopropanol | 2 |
| Water | 1.5 |
| E11126 colloidal silica surface treated | 1.9 |

EXAMPLES

Surface functionalization of Colloidal silica dispersions using polysiloxane oligomer preparations is conducted as follows:

A solution of colloidal silica is prepared for surface functionalization by adding 59.28 g ST-32C Nissan Chemical America Corp. to a 250 glass vessel and further adding 27.98 g distilled water, and 9.85 g Ethylene Glycol cosolvent (Sigma Aldrich corp.). This mixture is brought to 50° C. while mixing by magnetic stirring with a magnetic stir bar & stir plate.

A portion of silane surface treatment (hydrophilic silanes, mixture of hydrophilic and hydrophobic silanes, or polysiloxane oligomer preparation) (2.9 grams) is placed in an addition funnel and then added dropwise to the stirring colloidal silica mixture. After the polysiloxane oligomer preparation solution addition is finished the solution is allowed to react at 50-55° C. for a period of 3 hours. Each surface functionalization reaction is performed with these component proportions. Some example combinations resulted in precipitates or gelled colloidal silica/oligomer mixtures and are not evaluated further.

Preparation of E11125 Surface Functionalized Colloidal Silica

A Polysiloxane oligomer premix was prepared from 10 parts glycidoxypropyltrimethoxysilane, 5 parts vinyltrimethoxysilane, and 1 part pH3 water (prepared from distilled water and 10% HCl brought to pH 3 using a calibrated pH meter) by mixing these components and allowing the mixture to react at room temperature for a period of 30 minutes. A solution of colloidal silica is prepared for surface functionalization by adding 59.28 g ST-32C alkaline colloidal silica from Nissan Chemical America Corp. to a 250 glass vessel and further adding 27.98 g distilled water, and 9.85 g Ethylene Glycol cosolvent (Sigma Aldrich corp.). This mixture is brought to 50° C. while mixing by magnetic stirring with a magnetic stir bar & stir plate.

A portion of the GPTMS/VTMS Polysiloxane oligomer premix (2.9 grams) is placed in an addition funnel and then added dropwise to the stirring colloidal silica mixture. After the polysiloxane oligomer preparation solution addition is finished the solution is allowed to react at about 50° C.-55° C. for a period of 3 hours.

Preparation of E11126 Surface Functionalized Colloidal Silica

A solution of colloidal silica is prepared for surface functionalization by adding 52.68 g ST-025 acidic colloidal silica available from Nissan Chemical America Corp. to a 250 glass vessel and further adding 36 g distilled water, and 8 g Ethylene Glycol cosolvent (Sigma Aldrich corp.). This mixture is brought to 50° C. while mixing by magnetic stirring with a magnetic stir bar & stir plate.

Glycidoxypropyltrimethoxysilane (3.2 grams) is placed in an addition funnel and then added dropwise to the stirring colloidal silica mixture. After the monomeric organosilane addition is finished the solution is allowed to react at from about 50° C.-55° C. for a period of 3 hours.

Brine Resistance Testing:

Preparation of Brines for testing: A 10 wt % API Brine solution is prepared by dissolving 8 wt % NaCl (SigmaAldrich) and 2 wt % $CaCl_2$) (Sigma Aldrich) in distilled water. Artificial seawater is prepared by dissolving Fritz Pro Aquatics RPM Reef Pro Mix (Fritz Industries, Inc.) at 6 wt % in distilled water.

Testing for Brine resistance: Prepared silicasol examples are evaluated by placing 1 gram of example silica sol into 10 grams of Brine. Stability tests are performed at standard brine exposure periods of 10 minutes and 24 hours, observations being recorded at these times. Silica sol solutions that are stable to Brine exposure will remain clear and transparent/opalescent while unstable examples become visibly hazy and opaque after brine exposure. The following table summarizes the results.

| Example | Oligomer Ingredients | Oligomer Ingredients | Oligomer Result | Result after Oligomer undergoes surface functionalization with colloidal silica | Silica sol brine resistance with 10% API Brine after 10 minutes | Silica sol Brine resistance with artificial seawater after 10 minutes/after 24 hours |
|---|---|---|---|---|---|---|
| 1 | 1 part methacryloxypropyltrimethoxysilane | 10 parts glycidoxy propyltrimethoxy silane | slightly viscous oligomer solution | transparent/opalescent and appeared stable | Passed | Passed/Passed |
| 2 | 2 parts methacryloxypropyltrimethoxysilane | 10 parts glycidoxy propyltrimethoxy silane | slightly viscous oligomer solution | transparent/opalescent and appeared stable | Passed | Passed/Passed |
| 3 | 1 part isobutyltrimethoxysilane | 10 parts glycidoxy propyltrimethoxy silane | slightly viscous oligomer solution | transparent/opalescent and appeared stable | Passed | Passed/Passed |
| 4 | 2 parts isobutyltrimethoxysilane | 10 parts glycidoxy propyltrimethoxy silane | slightly viscous oligomer solution | transparent/opalescent and appeared stable | Stable after 10 minutes/Stable after 24 hours | Stable/Stable |
| 5 | 1 part isobutyltrimethoxysilane | 10 parts glycidoxy propyltrimethoxy silane | slightly viscous oligomer solution | transparent/opalescent and appeared stable | Stable after 10 minutes/Stable after 24 hours | Stable/Stable |
| 6 | 5 parts isobutyltrimethoxysilane | 10 parts glycidoxy propyltrimethoxy silane | slightly viscous oligomer solution | transparent/opalescent and appeared stable -had some microgel formation observed at the margin of the reaction vessel. | Stable after 10 minutes/Stable after 24 hours | Stable/Stable |
| 7 | 2 parts hexamethyldisiloxane | 10 parts glycidoxy propyltrimethoxy silane | slightly viscous oligomer solution | transparent/opalescent and appear stable | Stable after 10 minutes/Stable after 24 hours | Stable/Stable |

The above Examples are examples of surface treated colloidal silica that would be effective in the hydrocarbon formation treatment micellar solution of the instant claimed invention. The examples of the instant claimed invention are then formulated into micellar solution that will be suitable for injection into underperforming hydrocarbon formations. Examples of Hydrocarbon Formation Treatment Micellar Solution

| Fluid 1 (SG = 0.970) | Weight (g) | % of Each Component | Identity |
|---|---|---|---|
| VertecBio DLR | 3 | 20.00 | Dipentene mixture, Terpene based oil phase |
| AOS40 | 7.5 | 50.00 | Alkyl Olefin Sulfonate, anionic surfactant 40% actives |
| Isopropanol | 1 | 6.67 | Isopropanol, water soluble cosolvent |
| Water | 2.5 | 16.67 | Water |
| 2-Ethyl-1-Hexanol | 1 | 6.67 | Alcohol cosolvent, low polarity less water soluble |
| Total | 15 | 100 | |

| Fluid 2 (SG = 0.987) | Weight (g) | % of Each Component | |
|---|---|---|---|
| VertecBio DLR | 3 | 18.75 | Dipentene mixture, Terpene based oil phase |
| AOS40 | 7.5 | 46.875 | Alkyl Olefin Sulfonate, anionic surfactant 40% actives |
| Ethylan 1206 | 2 | 12.5 | Nonionic surfactant - Ethylene Oxide/Propylene Oxide copolymer |
| Isopropanol | 1 | 6.25 | Isopropanol, water soluble cosolvent |
| Water | 2.5 | 15.625 | Water |
| Total | 16 | 100 | |

| Fluid 2a | Weight (g) | % of Each Component | |
|---|---|---|---|
| VertecBio DLR | 3 | 19.83 | Dipentene mixture, Terpene based oil phase |
| AOS40 | 5 | 33.06 | Alkyl Olefin Sulfonate, anionic surfactant 40% actives |
| Ethylan 1206 | 1.33 | 8.79 | Nonionic surfactant - Ethylene Oxide/Propylene Oxide copolymer |
| IPA | 1 | 6.61 | Isopropanol, water soluble cosolvent |
| Water | 1 | 6.61 | Water |
| E11125 | 3.796 | 25.10 | ST-32C colloidal silica surface treated with GPTMS + Vinyl Trimethoxysilane oligomer |
| Total | 15.126 | 100.00 | |

| Fluid 2b | Weight (g) | % of Each Component | |
|---|---|---|---|
| VertecBio DLR | 3 | 19.83 | Dipentene mixture, Terpene based oil phase |
| AOS40 | 5 | 33.06 | Alkyl Olefin Sulfonate, anionic surfactant 40% actives |
| Ethylan 1206 | 1.33 | 8.79 | Nonionic surfactant-Ethylene Oxide/Propylene Oxide copolymer |
| IPA | 1 | 6.61 | Isopropanol, water soluble cosolvent |
| Water | 1 | 6.61 | Water |
| E11126 | 3.796 | 25.10 | Surface treated acidic colloidal silica, 10-15 nm |
| Total | 15.126 | 100 | |

| Fluid 2c | Weight (g) | % of Each Component | |
|---|---|---|---|
| VertecBio DLR | 3 | 19.60 | Dipentene mixture, Terpene based oil phase |
| AOS40 | 6.25 | 40.83 | Alkyl Olefin Sulfonate, anionic surfactant 40% actives |
| Ethylan 1206 | 1.66 | 10.84 | Nonionic surfactant - Ethylene Oxide/Propylene Oxide copolymer |
| Isopropanol | 1 | 6.53 | Isopropanol, water soluble cosolvent |
| Water | 1.5 | 9.80 | Water |
| E11125 | 1.898 | 12.40 | ST-32C surface treated with GPTMS + Vinyl Trimethoxysilane oligomer |
| Total | 15.308 | 100 | |

| Fluid 2d | Weight (g) | % of Each Component | |
|---|---|---|---|
| VertecBio DLR | 3 | 19.60 | Dipentene mixture, Terpene based oil phase |
| AOS40 | 6.25 | 40.83 | Alkyl Olefin Sulfonate, anionic surfactant 40% actives |
| Ethylan 1206 | 1.66 | 10.84 | Nonionic surfactant - Ethylene Oxide/Propylene Oxide copolymer |
| Isopropanol | 1 | 6.53 | Isopropanol, water soluble cosolvent |
| Water | 1.5 | 9.80 | Water |
| E11126 | 1.898 | 12.40 | Surface treated acidic colloidal silica, 10-15 nm |
| Total | 15.308 | 100 | |

Hele-Shaw Cell Test Showed Micellar Solution 1 and 2 to have Very Similar Oil Recovery to Control CNF

| Amott Cell Testing Fluid | Core | Silurian Dolomite Cores Dry Weight | Imbibed Weight | Oil Weight | Extracted Core Weight | Recovered Oil | % Recovery | Average Recovery % |
|---|---|---|---|---|---|---|---|---|
| Fluid 1 | 1 | 66.32 | 68.17 | 1.85 | 67.99 | 0.18 | 9.73 | |
| Fluid 1 | 2 | 64.93 | 66.67 | 1.74 | 66.55 | 0.12 | 6.9 | |
| Fluid 1 | 3 | 63.94 | 66.08 | 2.14 | 65.89 | 0.19 | 8.88 | 8.5 |
| Fluid 2 | 4 | 61.55 | 64.21 | 2.66 | 63.89 | 0.32 | 12.03 | |
| Fluid 2 | 5 | 65.46 | 66.64 | 1.18 | 66.75 | −0.11 | −9.32 | |
| Fluid 2 | 6 | 65.65 | 66.48 | 0.83 | 66.93 | −0.45 | −54.22 | −17.17 (anomalous result due to low rock porosity) |
| Control CNF* | 7 | 64.08 | 65.74 | 1.66 | 65.41 | 0.33 | 19.88 | |
| Control CNF | 8 | 60.17 | 63.07 | 2.9 | 62.57 | 0.5 | 17.24 | |
| Control CNF | 9 | 62.41 | 64.87 | 2.46 | 64.5 | 0.37 | 15.04 | 17.39 |

*Complex Nano Micellar solution (CNF): are commercially available micellar solution prepared with D-Limonene as oil-phase in combination with surfactants, cosolvents, and water.

| Fluid 3 | Weight (g) | % of Each Component | |
|---|---|---|---|
| VertecBio DLR | 0.16 | 1 | Dipentene mixture, Terpene based oil phase |
| VertecBio Gold | 1.84 | 11.5 | Methyl Soyate oil phase |
| AOS40 | 7.5 | 46.875 | Alkyl Olefin Sulfonate, anionic surfactant 40% actives |
| Ethylan 1206 | 2 | 12.5 | Nonionic surfactant - Ethylene Oxide/Propylene Oxide copolymer |
| IPA | 2 | 12.5 | Isopropanol, water soluble cosolvent |
| Tap Water | 2.5 | 15.625 | Water |
| Total | 16 | 100 | |

| Fluid 3a | Weight (g) | % of Each Component | |
|---|---|---|---|
| VertecBio DLR | 0.12 | 0.75 | Dipentene mixture, Terpene based oil phase |
| VertecBio Gold | 1.38 | 8.625 | Methyl Soyate oil phase |
| AOS40 | 7.5 | 46.875 | Alkyl Olefin Sulfonate, anionic surfactant 40% actives |
| Ethylan 1206 | 2 | 12.5 | Nonionic surfactant - Ethylene Oxide/Propylene Oxide copolymer |
| IPA | 2.5 | 15.625 | Isopropanol, water soluble cosolvent |
| Tap Water | 2.5 | 15.625 | Water |
| Total | 16 | 100 | |

| Fluid 4 | Weight (g) | % of Each Component | |
|---|---|---|---|
| VertecBio DLR | 0.16 | 1.05 | Dipentene mixture, Terpene based oil phase |
| VertecBio Gold | 1.84 | 12.02 | Methyl Soyate oil phase |
| AOS40 | 6.25 | 40.82 | Alkyl Olefin Sulfonate, anionic surfactant 40% actives |
| Ethylan 1206 | 1.66 | 10.84 | Nonionic surfactant - Ethylene Oxide/Propylene Oxide copolymer |
| IPA | 2 | 13.06 | Isopropanol, water soluble cosolvent |
| Tap Water | 1.5 | 9.80 | Water |
| E11126 | 1.9 | 12.41 | Surface treated acidic colloidal silica, 10-15 nm |
| Total | 15.31 | 100 | |

| Fluid 3b | Weight (g) | % of Each Component | |
|---|---|---|---|
| VertecBio DLR | 0.08 | 0.5 | Dipentene mixture, Terpene based oil phase |
| VertecBio Gold | 0.92 | 5.75 | Methyl Soyate oil phase |
| AOS40 | 7.5 | 46.875 | Alkyl Olefin Sulfonate, anionic surfactant 40% actives |
| Ethylan 1206 | 2 | 12.5 | Nonionic surfactant - Ethylene Oxide/Propylene Oxide copolymer |
| IPA | 3 | 18.75 | Isopropanol, water soluble cosolvent |
| Tap Water | 2.5 | 15.625 | Water |
| Total | 16 | 100 | |

| Ammot Cell Testing Fluid | Core | Boise Sandstone Cores Dry Weight | Imbibed Weight | Oil Weight | Extracted Core Weight | Recovered Oil | % Recovery | Average Recovery % |
|---|---|---|---|---|---|---|---|---|
| 3 | 1 | 43.61 | 50.3 | 6.69 | 49.53 | 0.77 | 11.51 | |
| 3 | 2 | 45.93 | 52.26 | 6.33 | 50.61 | 1.65 | 26.07 | |
| 3 | 3 | 45.4 | 51.82 | 6.42 | 50.62 | 1.2 | 18.69 | 18.76 |
| 4 | 4 | 44.95 | 51.21 | 6.26 | 47.41 | 3.8 | 60.7 | |
| 4 | 5 | 45.74 | 51.98 | 6.24 | 48.2 | 3.78 | 60.58 | |
| 4 | 6 | 42.55 | 49.06 | 6.51 | 44.59 | 4.47 | 68.66 | 63.31 |
| Control CNF* | 7 | 46.02 | 52.19 | 6.17 | 48.78 | 3.41 | 55.27 | |
| Control CNF* | 8 | 42.76 | 49.26 | 6.5 | 45.44 | 3.82 | 58.77 | |
| Control CNF* | 9 | 43.21 | 49.92 | 6.71 | 49.13 | 0.79 | 11.77 | 41.94 |

*Complex Nano Micellar solution (CNF): are commercially available micellar solution prepared with D-Limonene as oil-phase in combination with surfactants, cosolvents, and water.

| Example 5A Component | Mass (g) |
|---|---|
| VertecBio DLR | 3 |
| AOS-40 | 7.5 |
| Ethylan 1206 | 2 |
| Isopropanol | 1 |
| Water | 2.5 |
| Total | 16 |
| Example 5B | |
| VertecBio DLR | 3 |
| AOS-40 | 7.5 |
| Isopropanol | 1 |
| Water | 2.5 |
| 2-Ethyl-1-hexanol | 1 |
| Total | 15 |

Example 6—Mixture of Comparative Examples and Working Examples

| Component | Mass (g) | Mass (g) | Mass (g) | Mass (g) | Mass (g) |
|---|---|---|---|---|---|
| VertecBio DLR | 0.24 | 0.2 | 0.16 | 0.12 | 0.08 |
| VertecBio Gold | 2.76 | 2.3 | 1.84 | 1.38 | 0.92 |
| AOS-40 | 7.5 | 7.5 | 7.5 | 7.5 | 7.5 |
| Ethylan 1206 | 2 | 2 | 2 | 2 | 2 |
| Isopropanol | 1 | 1.5 | 2 | 2.5 | 3 |
| Water | 2.5 | 2.5 | 2.5 | 2.5 | 2.5 |
| Total | 16 | 16 | 16 | 16 | 16 |

| | Worst | Better | | | |
|---|---|---|---|---|---|
| VertecBio DLR | 0.16 | 0.16 | 0.12 | | |
| VertecBio Gold | 1.84 | 1.84 | 1.38 | | |
| AOS-40 | 5 | 6.25 | 6.25 | | |
| Ethylan 1206 | 1.33 | 1.66 | 1.66 | | |
| Isopropanol | 2 | 2 | 2.5 | | |
| Water | 1 | 1.5 | 1.5 | | |
| E11125 (ST-32C colloidal Silica, surface treated with GPTMS + Vinyl Trimeth-Oxysilane oligomer | 3.8 | 1.9 | 1.9 | | |

-continued

| Component | Mass (g) | Mass (g) | Mass (g) | Mass (g) | Mass (g) |
|---|---|---|---|---|---|
| | Worst | Better | 1% Worse than Better | | |
| Ingredients | | | | | |
| VertecBio DLR | 0.16 | 0.12 | | | |
| VertecBio Gold | 1.84 | 1.38 | | | |
| AOS-40 | 6.25 | 6.25 | | | |
| Ethylan 1206 | 1.66 | 1.66 | | | |
| IPA | 2 | 2.5 | | | |
| Tap Water | 1.5 | 1.5 | | | |
| E11126 | 1.9 | 1.9 Worse | | | |

In certain embodiments, Example 7, the following ingredients are present in the treatment fluid.

| Component | Mass (g) |
|---|---|
| VertecBio DLR | 3 |
| AOS-40 | 7.5 |
| Ethylan 1206 | 2 |
| Isopropanol | 1 |
| Water | 2.5 |
| Total | 16 |
| VertecBio DLR | 3 |
| AOS-40 | 7.5 |
| Isopropanol | 1 |
| Water | 2.5 |
| 2-Ethyl-1-hexanol | 1 |
| Total | 15 |

In other embodiments, Example 8, these ingredients are present in the treatment formulation.

| Component | Mass (g) | Mass (g) | Mass (g) |
|---|---|---|---|
| VertecBio DLR | 0.16 | 0.12 | 0.08 |
| VertecBio Gold | 1.84 | 1.38 | 0.92 |
| AOS-40 | 7.5 | 7.5 | 7.5 |
| Ethylan 1206 | 2 | 2 | 2 |

-continued

| Component | Mass (g) | Mass (g) | Mass (g) |
|---|---|---|---|
| isopropyl alcohol | 2 | 2.5 | 3 |
| Water | 2.5 | 2.5 | 2.5 |
| Total | 16 | 16 | 16 |

In other embodiments, Example 9, the named ingredients are present in the treatment formulation.

| Component | Mass (g) |
|---|---|
| VertecBio DLR | 0.16 |
| VertecBio Gold | 1.84 |
| AOS-40 | 6.25 |
| Ethylan 1206 | 1.66 |
| Isopropyl alcohol | 2 |
| Water | 1.5 |
| E11126 | 1.9 |

In the claims, as well as in the specification above, all transitional phrases such as "comprising," "including," "carrying," "having," "containing," "involving," "holding," and the like are to be understood to be open-ended, i.e. to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention. All patents, patent applications, and references cited in any part of this disclosure are incorporated herein in their entirety by reference.

What is claimed is:

1. A hydrocarbon formation treatment micellar solution fluid wherein the micellar solution fluid comprises
   a) water
   b) a non-terpene oil-based moiety, and
   c) a brine resistant aqueous colloidal silica sol;
wherein the brine resistant aqueous colloidal silica sol has silica particles surface functionalized with at least one moiety selected from the group consisting of
   (i) a hydrophilic organosilane,
   (ii) a mixture of hydrophilic and hydrophobic organosilanes, and
   (iii) a polysiloxane oligomer,
wherein the silica particles have an average diameter of between about 1 nm and about 100 nm, and
wherein the brine resistant aqueous colloidal silica sol passes these brine resistant tests: API Brine Visual and 24 Hour Seawater Visual.

2. The hydrocarbon formation treatment micellar solution fluid of claim 1, further comprising a terpene or terpenoid, wherein the ratio of total water to terpene or terpenoid is at least about 15 to 1.

3. The hydrocarbon formation treatment micellar solution fluid of claim 2, wherein the ratio of total water to the terpene or terpenoid is at least about 30 to 1.

4. The hydrocarbon formation treatment micellar solution fluid of claim 1, wherein the silica particles have an average diameter of between about 5 nm and about 30 nm.

5. The hydrocarbon formation treatment micellar solution fluid of claim 1, wherein the silica particles have an average diameter of less than or equal to 25 nm.

6. The hydrocarbon formation treatment micellar solution fluid of claim 1, wherein the brine resistant aqueous colloidal silica sol has silica particles surface functionalized with the hydrophilic organosilane.

7. The hydrocarbon formation treatment micellar solution fluid of claim 6, wherein the hydrophilic organosilane includes a glycidyl group.

8. The hydrocarbon formation treatment micellar solution fluid of claim 1, wherein the brine resistant aqueous colloidal silica sol has silica particles surface functionalized with the mixture of hydrophilic and hydrophobic organosilane.

9. The hydrocarbon formation treatment micellar solution fluid of claim 1, wherein the brine resistant aqueous colloidal silica sol has silica particles surface functionalized with the polysiloxane oligomer.

10. The hydrocarbon formation treatment micellar solution fluid of claim 9, wherein the polysiloxane oligomer comprises Ingredient A and Ingredient B, wherein:
   (1) Ingredient A is glycidoxypropyltrimethoxysilane and
   (2) Ingredient B is selected from the group consisting of methacryloxypropyltrimethoxysilane, isobutyltrimethoxysilane, vinyltrimethoxysilane, 2-(7-oxabicyclo[4.1.0]hept-3-yl)ethyltrimethoxysilane, and hexamethyldisiloxane.

11. The hydrocarbon formation treatment micellar solution fluid of claim 1, wherein the hydrophilic organosilane monomer unit exhibits a critical surface tension in the range of from about 40 mN/m to about 50 mN/m.

12. The hydrocarbon formation treatment micellar solution fluid of claim 1, wherein the hydrophobic organosilane monomer unit exhibits a critical surface tension in the range of from about 15 mN/m to about 39.5 mN/m.

13. The hydrocarbon formation treatment micellar solution fluid of claim 1, wherein the hydrophilic organosilane monomer unit exhibits a critical surface tension in the range of from about 40 mN/m to about 50 mN/m and wherein the hydrophobic organosilane monomer unit exhibits a critical surface tension in the range of from about 15 mN/m to about 39.5 mN/m.

* * * * *